United States Patent
Park et al.

(10) Patent No.: US 12,004,154 B2
(45) Date of Patent: Jun. 4, 2024

(54) METHOD FOR PERFORMING UPLINK TRANSMISSION IN WIRELESS COMMUNICATION SYSTEM AND APPARATUS THEREFOR

(71) Applicant: LG ELECTRONICS INC., Seoul (KR)

(72) Inventors: Jonghyun Park, Seoul (KR); Jiwon Kang, Seoul (KR); Seongwon Go, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 454 days.

(21) Appl. No.: 17/294,668

(22) PCT Filed: Nov. 25, 2019

(86) PCT No.: PCT/KR2019/016293
§ 371 (c)(1),
(2) Date: May 17, 2021

(87) PCT Pub. No.: WO2020/106129
PCT Pub. Date: May 28, 2020

(65) Prior Publication Data
US 2022/0015118 A1   Jan. 13, 2022

(30) Foreign Application Priority Data
Nov. 23, 2018   (KR) .................. 10-2018-0146683

(51) Int. Cl.
*H04W 72/1268* (2023.01)
*H04L 5/00* (2006.01)
(Continued)

(52) U.S. Cl.
CPC ....... *H04W 72/1268* (2013.01); *H04L 5/0051* (2013.01); *H04W 72/046* (2013.01); *H04W 72/20* (2023.01); *H04W 72/54* (2023.01)

(58) Field of Classification Search
CPC ........... H04W 72/1268; H04W 72/046; H04W 72/20; H04W 72/54; H04W 72/23;
(Continued)

(56) References Cited

U.S. PATENT DOCUMENTS

2018/0227094 A1* 8/2018 Liu .................... H04B 7/06966

FOREIGN PATENT DOCUMENTS

| KR | 1020180101336 | 9/2018 |
| KR | 1020180122564 | 11/2018 |

OTHER PUBLICATIONS

Samsung, Enhancements on multi-beam operations, 3GPP TSG RAN WG1 Meeting #95, Spokane, USA, Nov. 12-16, 2018, R1-1813004. (Year: 2018).*
(Continued)

*Primary Examiner* — Shailendra Kumar
(74) *Attorney, Agent, or Firm* — LEE, HONG, DEGERMAN, KANG & WAIMEY

(57) ABSTRACT

The present disclosure provides a method for performing uplink transmission in a wireless communication system and an apparatus therefor. Specifically, a method for transmitting an uplink data channel by a user equipment (UE) in a wireless communication may comprise the steps of: receiving configuration information related to the uplink data channel; receiving control information for scheduling transmission of the uplink data channel; and transmitting the uplink data channel on the basis of the control information. Here, the configuration information may include one or more configurations including at least one of i) a transmission unit and ii) a beam, which are related to the transmis-
(Continued)

sion of the uplink data channel. In addition, on the basis of the one or more configurations, the control information may include information indicating a transmission unit and a beam to be applied to the transmission of the uplink data channel.

9 Claims, 17 Drawing Sheets

(51) Int. Cl.
*H04W 72/044* (2023.01)
*H04W 72/20* (2023.01)
*H04W 72/54* (2023.01)

(58) Field of Classification Search
CPC ... H04L 5/0051; H04L 5/0023; H04L 5/0044; H04L 5/0048; H04L 5/0064; H04L 5/0091; H04B 7/0404; H04B 7/0408; H04B 7/0695
See application file for complete search history.

(56) References Cited

OTHER PUBLICATIONS

Huawei, HiSilicon, 3Enhancements on multi-beam operation, GPP TSG RAN WG1 Meeting #95, Spokane, USA, Nov. 12-16, 2018, R1-1812244. (Year: 2018).*
Nokia, Enhancements on Multi-beam Operation, 3GPP TSG RAN WG1 Meeting #95, Spokane, USA, Nov. 12-16, 2018, R1-1813490. (Year: 2018).*
LG Electronics, Feature lead summary of Enhancements on Multi-beam Operations, 3GPP TSG RAN WG1 Meeting #95, Spokane, USA, Nov. 12-16, 2018, R1-1813944. (Year: 2018).*
PCT International Application No. PCT/KR2019/016293, International Search Report dated Mar. 13, 2020, 5 pages.
Samsung, "Enhancements on multi-beam operations," 3GPP TSG RAN WG1 Meeting #95, R1-1813004, Nov. 2018, 8 pages.
LG Electronics, "Feature lead summary on Enhancements on Multi-beam Operations," 3GPP TSG RAN WG1 Meeting #95, R1-1813944, Nov. 2018, 25 pages.

* cited by examiner

[FIG. 1]
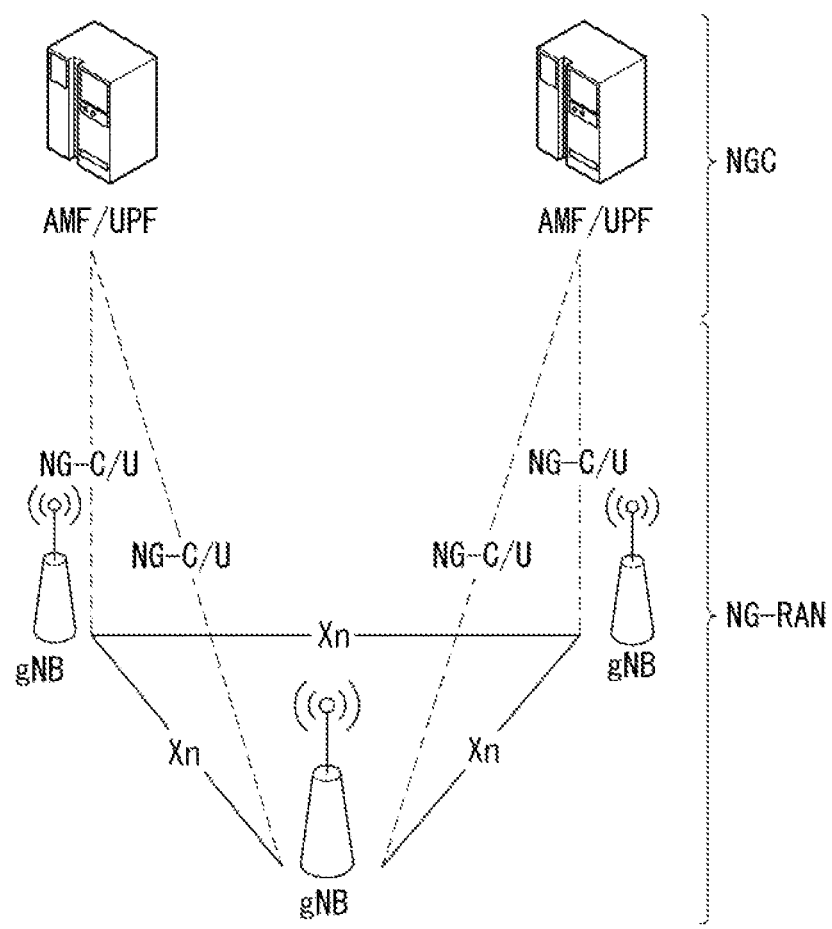

[FIG. 2]
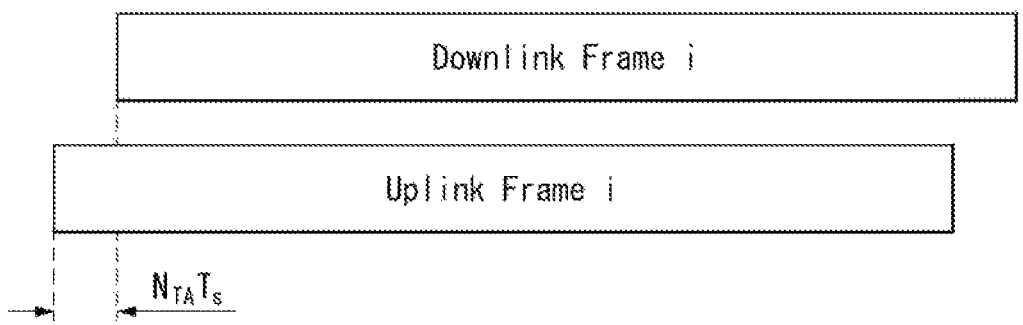

[FIG. 3]
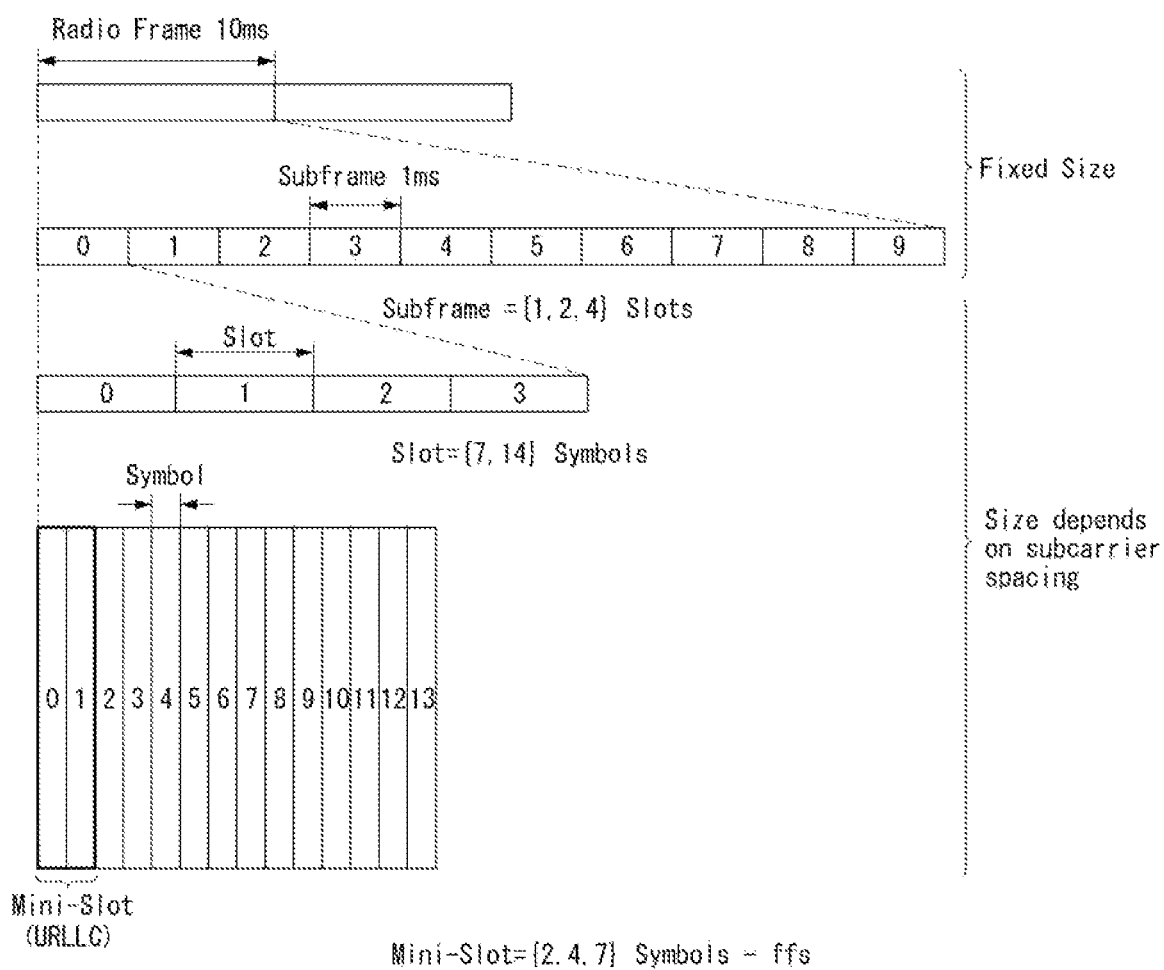

[FIG. 4]
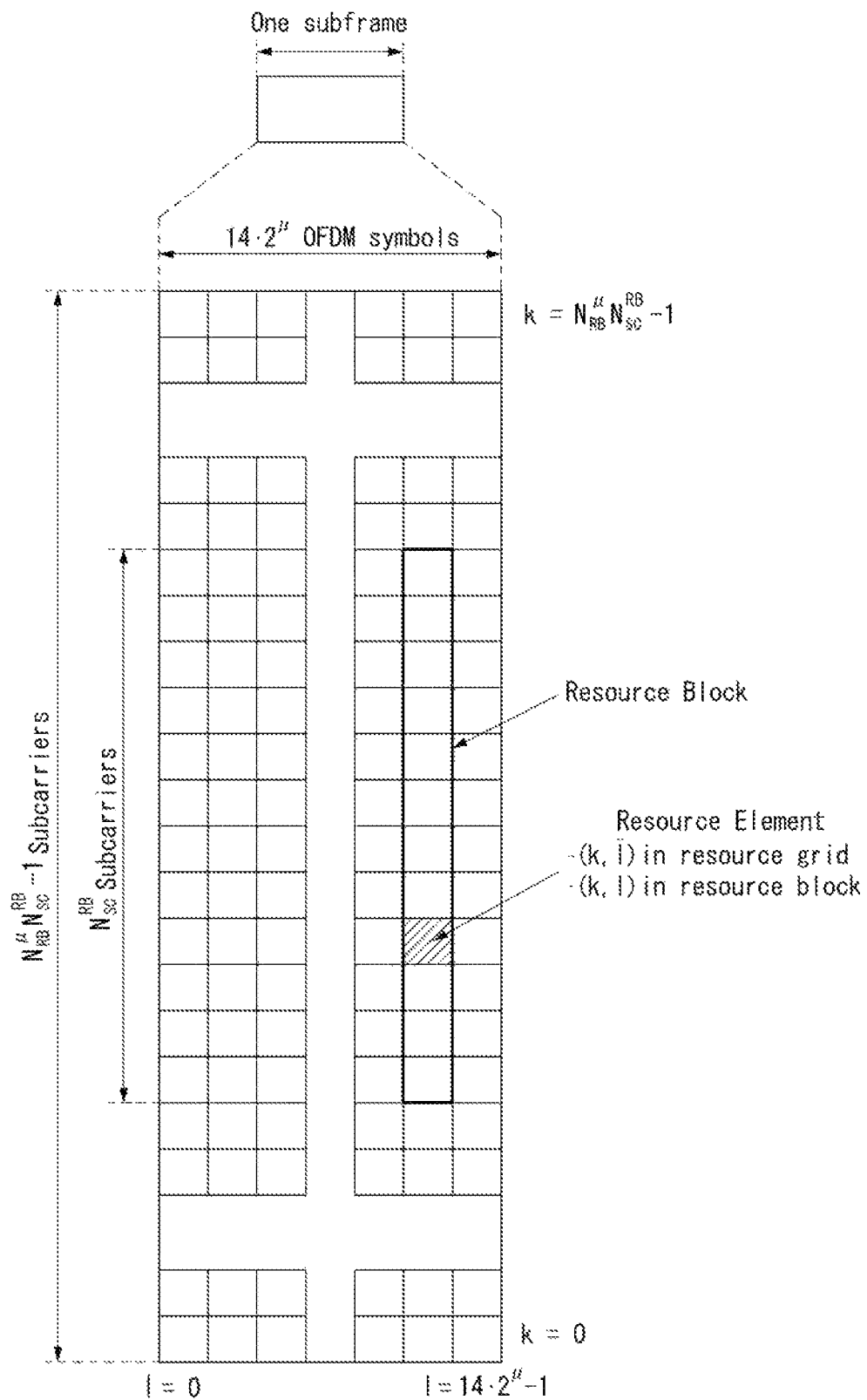

[FIG. 5]
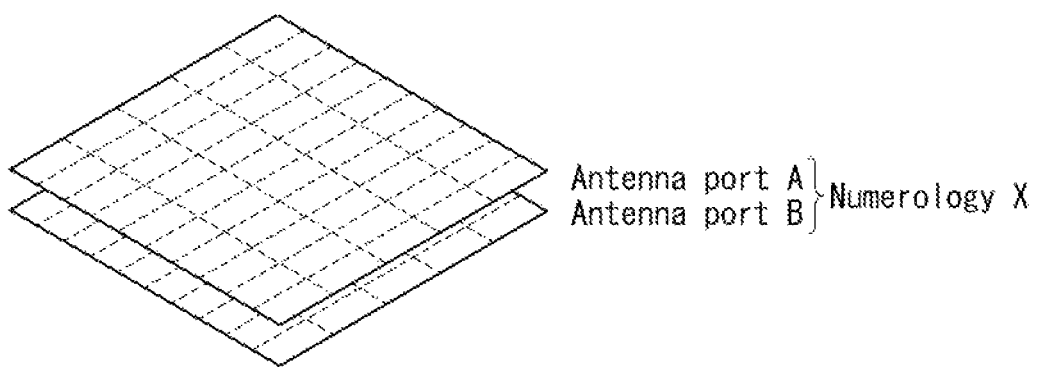
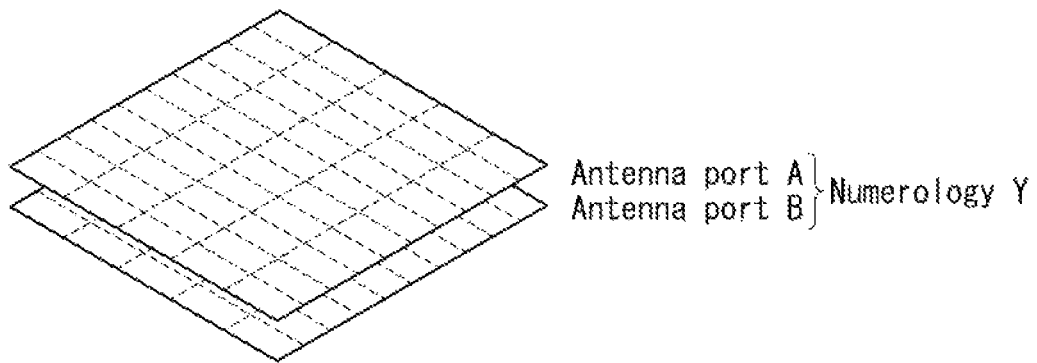

[FIG. 6]
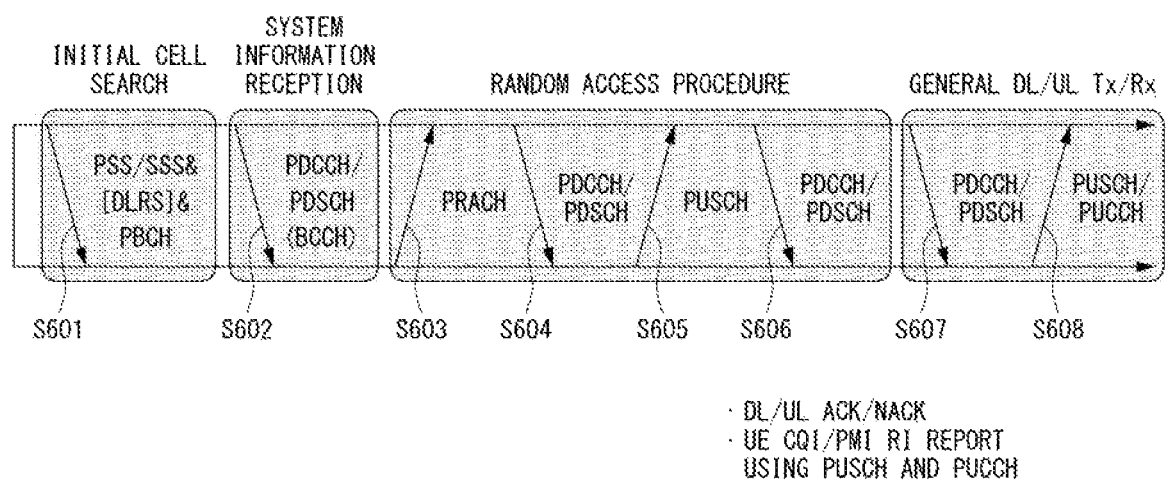

[FIG. 7]
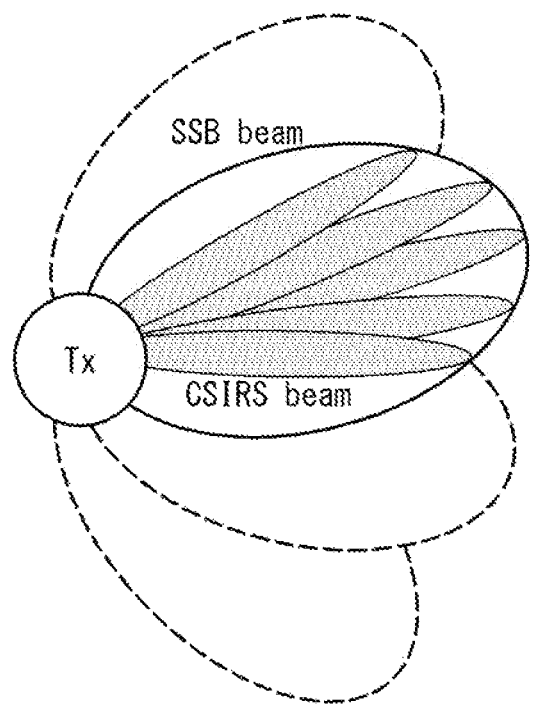

[FIG. 8]
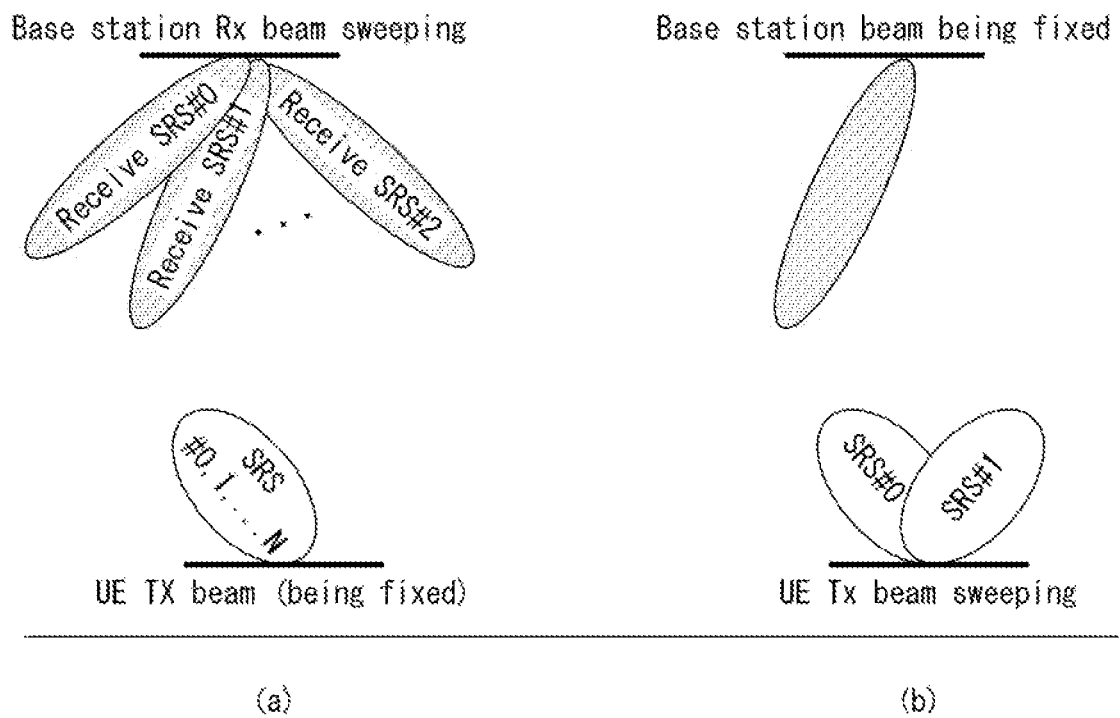

[FIG. 9]
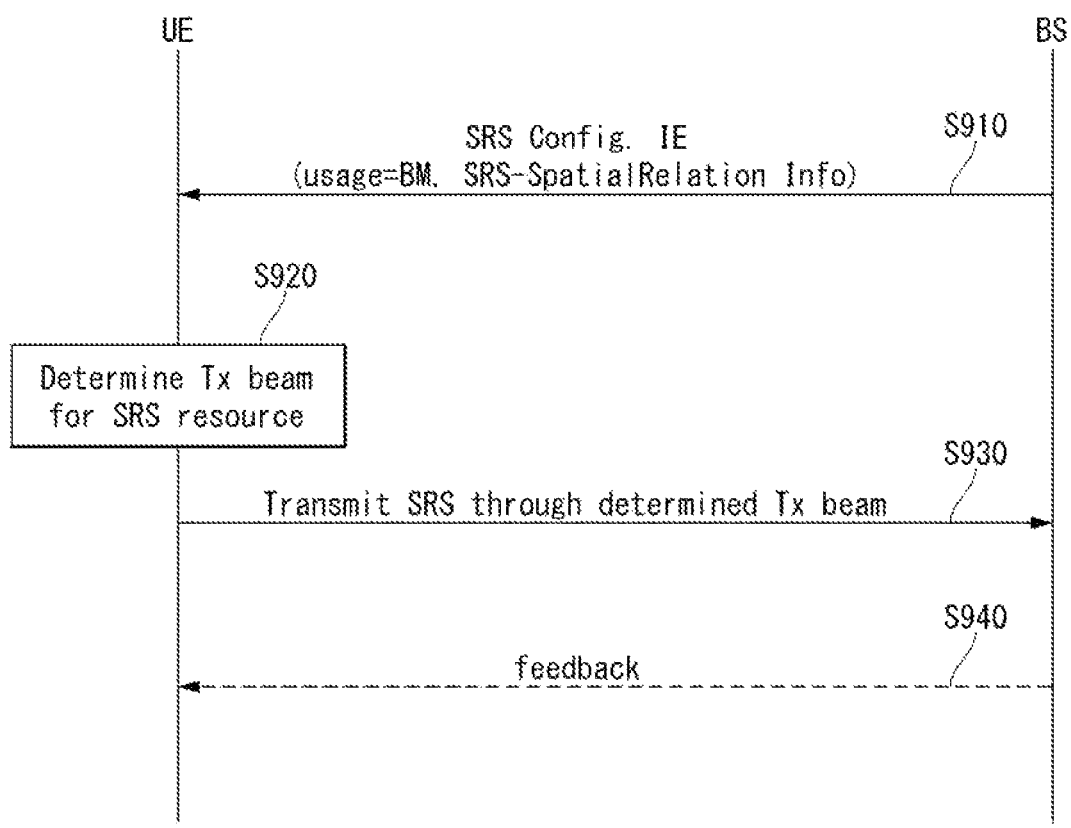

[FIG. 10]
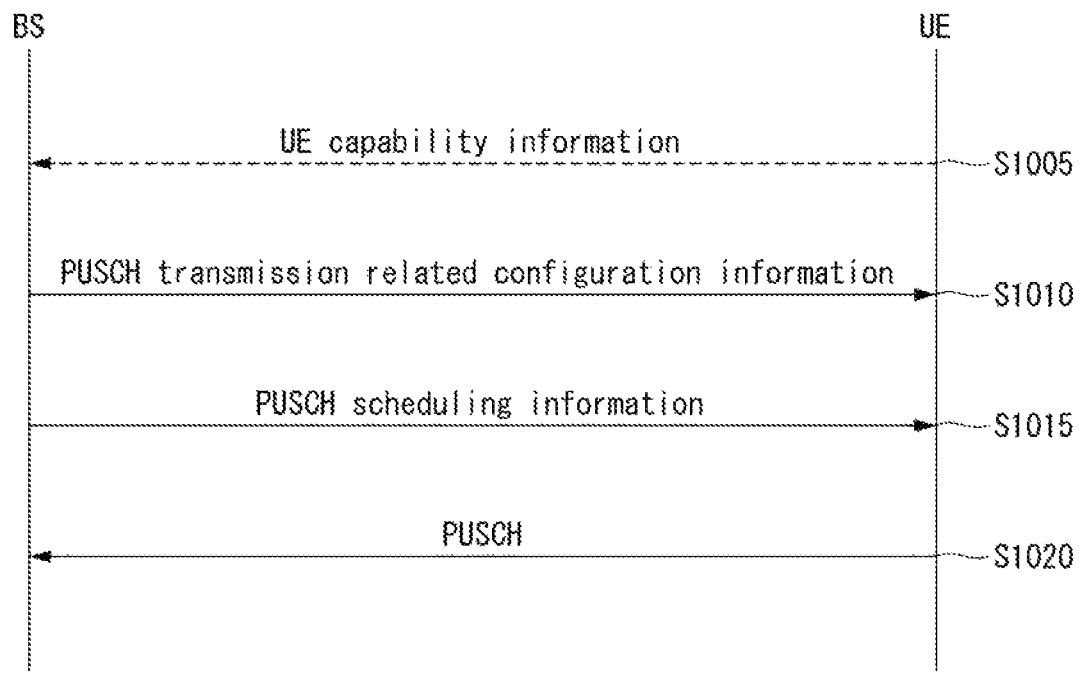

[FIG. 11]
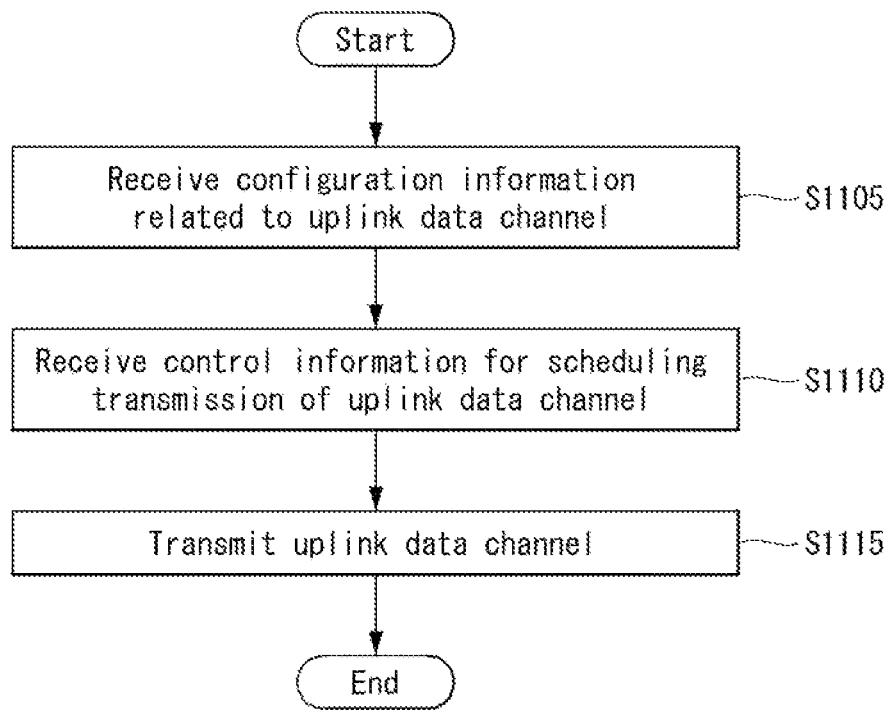

[FIG. 12]
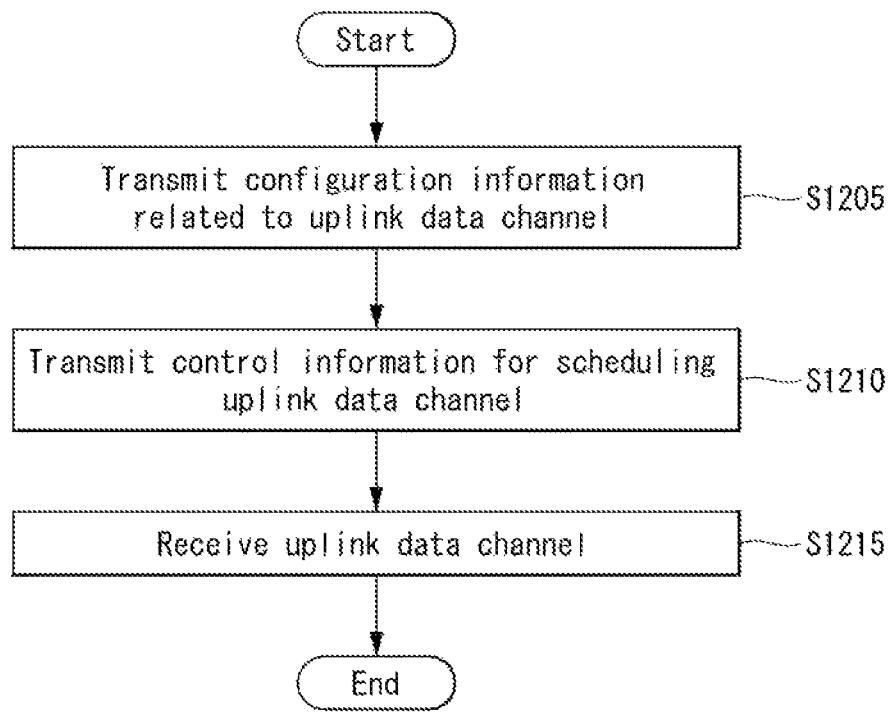

[FIG. 13]
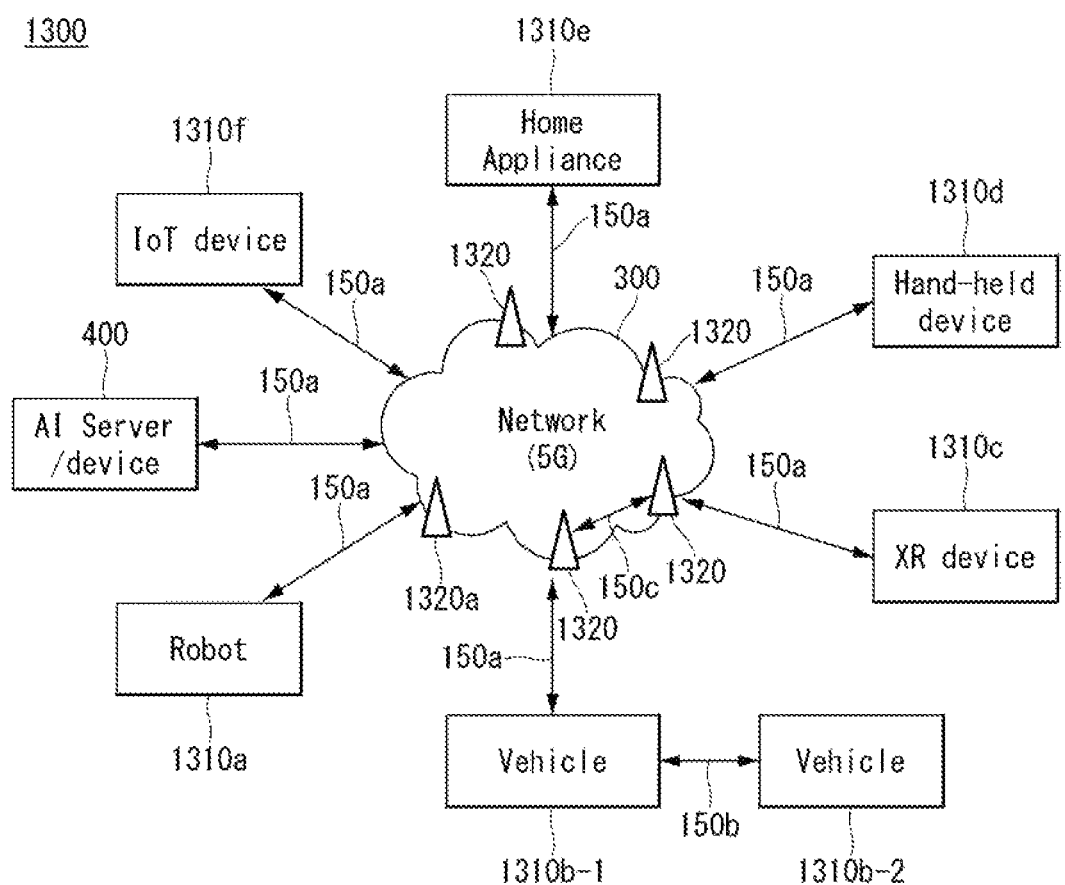

[FIG. 14]
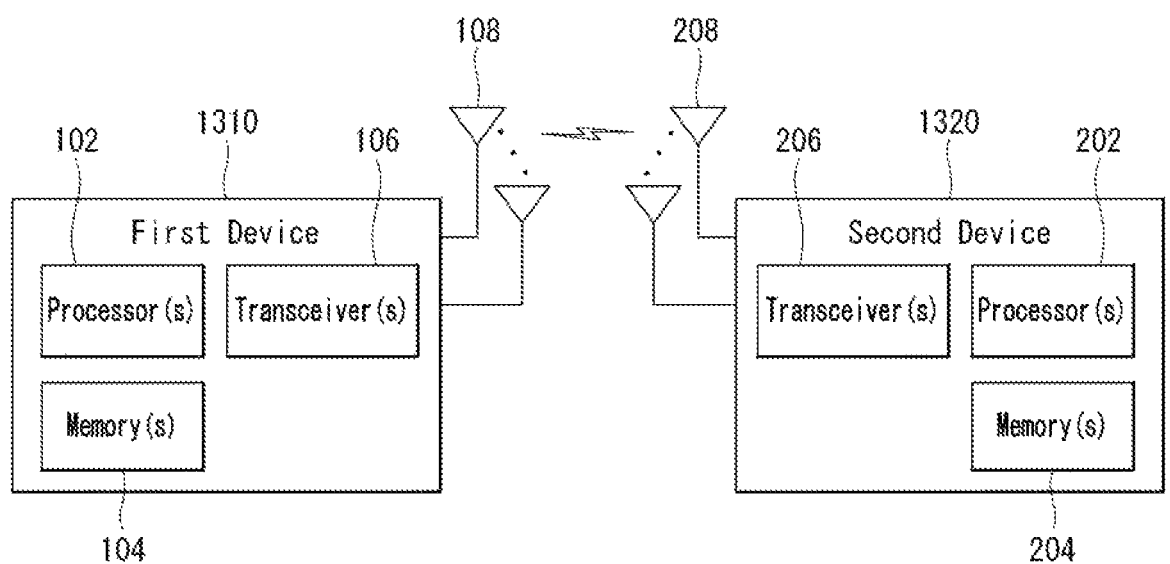

[FIG. 15]
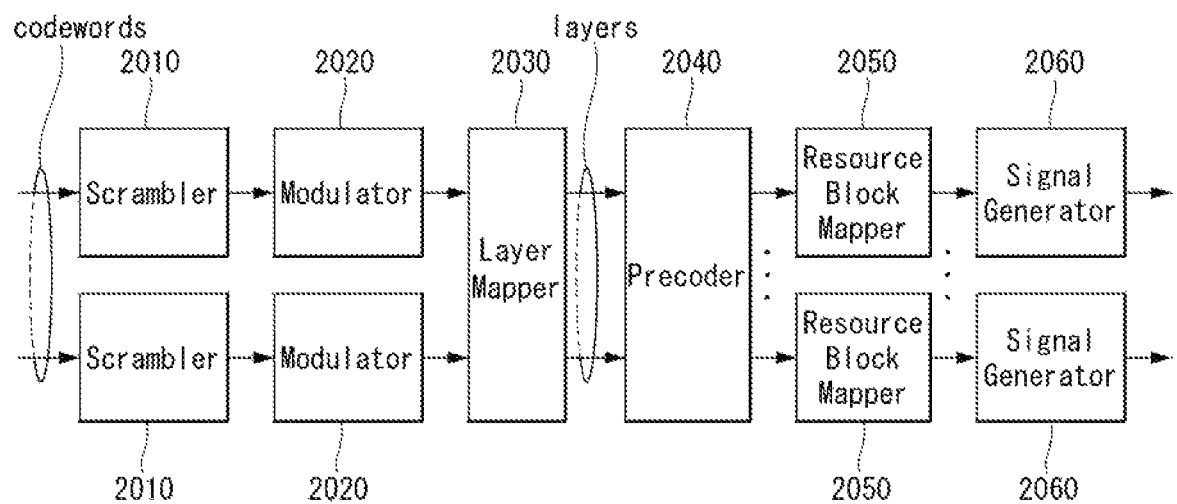

[FIG. 16]
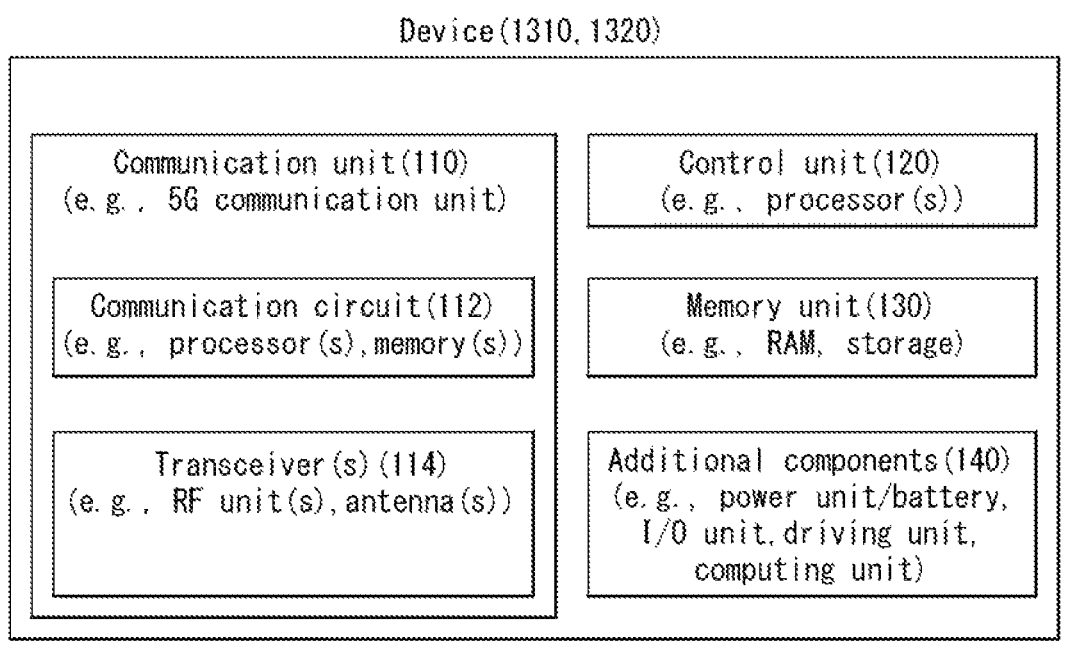

[FIG. 17]
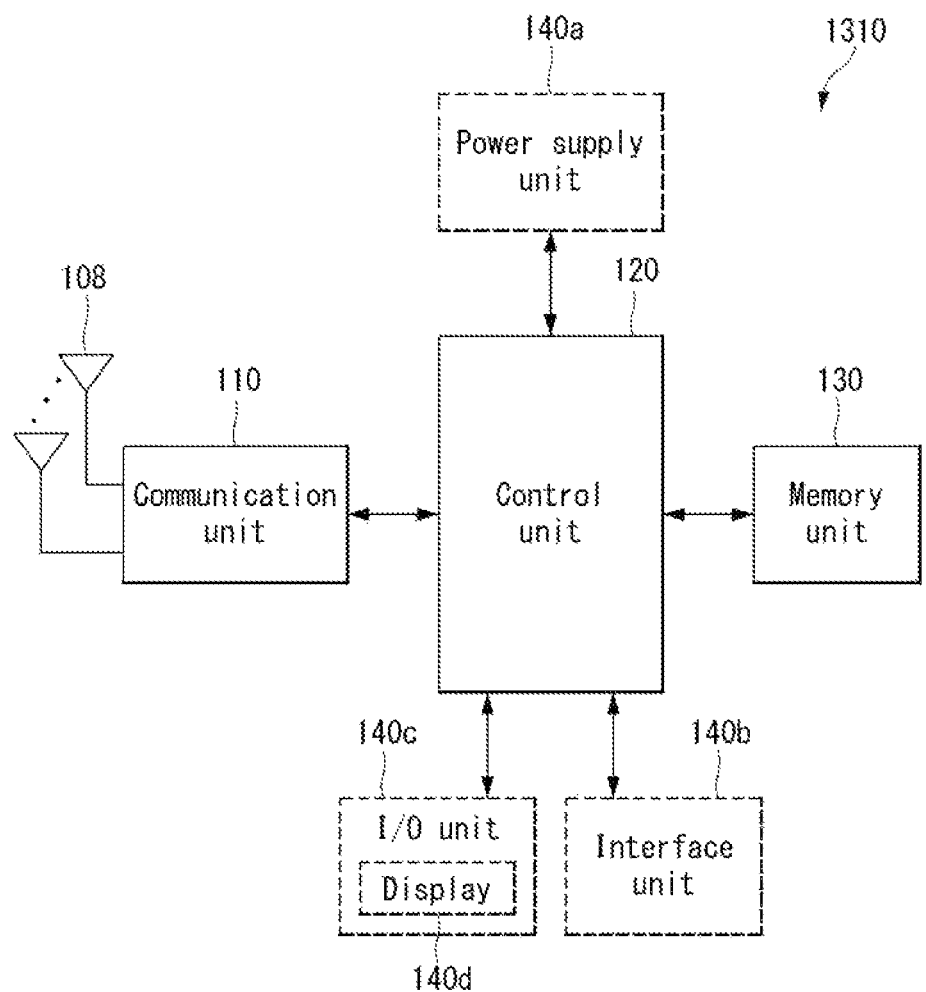

METHOD FOR PERFORMING UPLINK TRANSMISSION IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2019/016293, filed on Nov. 25, 2019, which claims the benefit of earlier filing date and right of priority to Korean Application No. 10-2018-0146683, filed on Nov. 23, 2018, the contents of which are all incorporated by reference herein in their entirety.

TECHNICAL FIELD

The present disclosure relates to a wireless communication system, and more particularly, to a method for performing uplink transmission in a wireless communication system and an apparatus supporting the same.

BACKGROUND ART

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

DISCLOSURE

Technical Problem

The present disclosure proposes a method for performing uplink transmission in a wireless communication system.

Specifically, the present disclosure proposes a method for performing signaling a configuration and/or an indication of a panel unit and/or a beam unit in relation to transmission and reception of an uplink data channel (e.g., PUSCH).

The technical problems to be solved by the present disclosure are not limited by the above-mentioned technical problems, and other technical problems which are not mentioned above can be clearly understood from the following description by those skilled in the art to which the present disclosure pertains.

Technical Solution

A method for transmitting, by a user equipment (UE), an uplink data channel in a wireless communication system according to an embodiment of the present disclosure may include: receiving configuration information related to the uplink data channel; receiving, control information for scheduling transmission of the uplink data channel; and transmitting the uplink data channel based on the control information. The configuration information may include one or more configurations including at least one of i) a transmission unit or ii) a beam, which are related to the transmission of the uplink data channel. Based on the one or more configurations, the control information may include information indicating a transmission unit and a beam to be applied to the transmission of the uplink data channel.

Further, in the method according to an embodiment of the present disclosure, the transmission unit to be applied to the transmission of the uplink data channel may be based on a set configured as one or more uplink reference signals, and the beam to be applied to the transmission of the uplink data channel may be based on any one of the one or more uplink reference signals.

Further, in the method according to an embodiment of the present disclosure, the set may include a set of sounding reference signal resources.

Further, in the method according to an embodiment of the present disclosure, the set of the sounding reference signal resources may be configured for a beam management usage.

Further, in the method according to an embodiment of the present disclosure, the transmission unit to be applied to the transmission of the uplink data channel may be based on a set configured as one or more downlink reference signals, and the beam to be applied to the transmission of the uplink data channel may be based on any one of the one or more downlink reference signals.

Further, in the method according to an embodiment of the present disclosure, the set may include at least one of a set of Channel State Information-Reference Signal (CSI-RS) resources or a set of synchronization signal block identifiers.

Further, the method according to an embodiment of the present disclosure may further include transmitting UE capability information related to the number of transmission units that the UE is able to support simultaneously for the transmission of the uplink data channel.

Further, in the method according to an embodiment of the present disclosure, a power control for the transmission of the uplink data channel may be configured for each transmission unit.

A user equipment (UE) transmitting an uplink data channel in a wireless communication system according to an embodiment of the present disclosure may include: a transceiver; at least one processor controlling the transceiver; and at least one memory functionally connected to the at least one processor. The at least one processor may be configured to receive configuration information related to the uplink data channel, receive, control information for scheduling transmission of the uplink data channel, and transmit the uplink data channel based on the control information. The configuration information may include one or more configurations including at least one of i) a transmission unit or ii) a beam, which are related to the transmission of the uplink data channel. Based on the one or more configurations, the control information may include information indicating a transmission unit and a beam to be applied to the transmission of the uplink data channel.

Further, in the UE according to an embodiment of the present disclosure, the transmission unit to be applied to the transmission of the uplink data channel may be based on a set configured as one or more uplink reference signals, and the beam to be applied to the transmission of the uplink data channel may be based on any one of the one or more uplink reference signals.

Further, in the UE according to an embodiment of the present disclosure, the set may include a set of sounding reference signal resources.

Further, in the UE according to an embodiment of the present disclosure, the set of the sounding reference signal resources may be configured for a beam management usage.

Further, in the UE according to an embodiment of the present disclosure, the transmission unit to be applied to the transmission of the uplink data channel may be based on a set configured as one or more downlink reference signals, and the beam to be applied to the transmission of the uplink data channel may be based on any one of the one or more downlink reference signals.

Further, in the UE according to an embodiment of the present disclosure, the set may include at least one of a set of Channel State Information-Reference Signal (CSI-RS) resources or a set of synchronization signal block identifiers.

An apparatus transmitting an uplink data channel in a wireless communication system according to an embodiment of the present disclosure may include: at least one processor; and at least one memory functionally connected to the at least one processor. The at least one processor may be configured to receive configuration information related to the uplink data channel, receive, control information for scheduling transmission of the uplink data channel, and transmit the uplink data channel based on the control information. The configuration information may include one or more configurations including at least one of i) a transmission unit or ii) a beam, which are related to the transmission of the uplink data channel. Based on the one or more configurations, the control information may include information indicating a transmission unit and a beam to be applied to the transmission of the uplink data channel.

Advantageous Effects

According to an embodiment of the present disclosure, an effect can be acquired, in which in relation to an operation in which a UE performs codebook based PUSCH transmission and/or non-codebook based PUSCH transmission, a BS can control uplink transmission in units of a specific panel and/or a specific beam of the UE.

Further, according to an embodiment of the present disclosure, there is an effect in which panel and/or beam selective PUSCH scheduling that accompanies enhanced power control of a panel and/or beam unit.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 is a diagram illustrating an example of an overall system structure of NR to which a method proposed in the present disclosure is applicable.

FIG. 2 illustrates a relationship between an uplink frame and a downlink frame in a wireless communication system to which a method proposed by the present disclosure is applicable.

FIG. 3 illustrates an example of a frame structure in an NR system.

FIG. 4 illustrates an example of a resource grid supported by a wireless communication system to which a method proposed in the present disclosure is applicable.

FIG. 5 illustrates examples of a resource grid for each antenna port and numerology to which a method proposed in the present disclosure is applicable.

FIG. 6 illustrates physical channels and general signal transmission used in a 3GPP system.

FIG. 7 illustrates an example of beamforming using SSB and CSI-RS.

FIG. 8 illustrates an example of a UL BM procedure using an SRS.

FIG. 9 is a flowchart showing an example of a UL BM procedure using the SRS.

FIG. 10 illustrates an example of a PUSCH transmission/reception procedure to which a method proposed in the present disclosure is applicable.

FIG. 11 illustrates an example of an operation flowchart of a UE that performs uplink data channel (e.g., PUSCH) transmission based on panel unit and/or beam unit scheduling to which a method proposed in the present disclosure is applicable.

FIG. 12 illustrates an example of an operation flowchart of a BS that performs uplink data channel (e.g., PUSCH) reception based on panel unit and/or beam unit scheduling to which a method proposed in the present disclosure is applicable.

FIG. 13 illustrates a communication system 1300 applied to the present disclosure.

FIG. 14 illustrates a wireless device applicable to the present disclosure.

FIG. 15 illustrates a signal processing circuit for a transmit signal.

FIG. 16 illustrates another example of a wireless device applied to the present disclosure.

FIG. 17 illustrates a hand-held device applied to the present disclosure.

MODE FOR DISCLOSURE

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

Hereinafter, downlink (DL) means communication from a base station to a terminal and uplink (UL) means communication from the terminal to the base station. In the downlink, a transmitter may be part of the base station, and a receiver may be part of the terminal. In the uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11 (Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

For clarity of description, the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. The LTE/NR may be collectively referred to as the 3GPP system. Matters disclosed in a standard document published before the present disclosure may refer to a background art, terms, abbreviations, etc., used for describing the present disclosure. For example, the following documents may be referenced.

3GPP LTE
36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. As such, the introduction of next-generation radio access technology considering enhanced mobile broadband communication (eMBB), massive MTC (mMTC), ultra-reliable and low latency communication (URLLC) is discussed, and in the present disclosure, the technology is called NR for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a New RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. By scaling a reference subcarrier spacing by an integer N, different numerologies can be defined.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used at an NG2 reference point between new RAN and NGC.

NG-U: A user plane interface used at an NG3 reference point between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: An end point of NG-U interface.

Overview of System

FIG. 1 illustrates an example overall NR system structure to which a method as proposed in the disclosure may apply.

Referring to FIG. 1, an NG-RAN is constituted of gNBs to provide a control plane (RRC) protocol end for user equipment (UE) and NG-RA user plane (new AS sublayer/PDCP/RLC/MAC/PHY).

The gNBs are mutually connected via an Xn interface.

The gNBs are connected to the NGC via the NG interface.

More specifically, the gNB connects to the access and mobility management function (AMF) via the N2 interface and connects to the user plane function (UPF) via the N3 interface.

New RAT (NR) Numerology and Frame Structure

In the NR system, a number of numerologies may be supported. Here, the numerology may be defined by the subcarrier spacing and cyclic prefix (CP) overhead. At this time, multiple subcarrier spacings may be derived by scaling the basic subcarrier spacing by integer N (or, μ). Further, although it is assumed that a very low subcarrier spacing is not used at a very high carrier frequency, the numerology used may be selected independently from the frequency band.

Further, in the NR system, various frame structures according to multiple numerologies may be supported.

Hereinafter, an orthogonal frequency division multiplexing (OFDM) numerology and frame structure that may be considered in the NR system is described.

The multiple OFDM numerologies supported in the NR system may be defined as shown in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

NR supports multiple numerologies (or subcarrier spacings (SCS)) for supporting various 5G services. For example, if SCS is 15 kHz, NR supports a wide area in typical cellular bands. If SCS is 30 kHz/60 kHz, NR supports a dense urban, lower latency and a wider carrier bandwidth. If SCS is 60 kHz or higher, NR supports a bandwidth greater than 24.25 GHz in order to overcome phase noise.

An NR frequency band is defined as a frequency range of two types FR1 and FR2. The FR1 and the FR2 may be configured as in Table 1 below. Furthermore, the FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

With regard to the frame structure in the NR system, the size of various fields in the time domain is expressed as a multiple of time unit of $T_s = 1/(\Delta f_{max} \cdot N_f)$, where $\Delta f_{max} = 480 \cdot 10^3$, and $N_f = 4096$. Downlink and uplink transmissions is constituted of a radio frame with a period of $T_f = (\Delta f_{max} N_f / 100) \cdot T_s = 10$ ms. Here, the radio frame is constituted of 10 subframes each of which has a period of $T_{sf}$ $(\Delta f_{max} N_f / 1000) \cdot T_s = 1$ ms In this case, one set of frames for uplink and one set of frames for downlink may exist.

FIG. 2 illustrates a relationship between an uplink frame and downlink frame in a wireless communication system to which a method described in the present disclosure is applicable.

As illustrated in FIG. 2, uplink frame number i for transmission from the user equipment (UE) should begin $T_{TA} = N_{TA} T_s$ earlier than the start of the downlink frame by the UE.

For numerology μ, slots are numbered in ascending order of $n_s^\mu \in \{0, \ldots, N_{subframe}^{slots,\mu} - 1\}$ in the subframe and in ascending order of $n_{s,f}^\mu \in \{0, \ldots, N_{frame}^{slots,\mu} - 1\}$ in the radio frame. One slot includes consecutive OFDM symbols of $N_{symb}^\mu$, and $N_{symb}^\mu$ is determined according to the used numerology and slot configuration. In the subframe, the start of slot $n_s^\mu$ is temporally aligned with the start of $N_s^\mu N_{symb}^\mu$.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ lot of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame, u}$ | $N_{slot}^{subframe, u}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame, u}$ | $N_{slot}^{subframe, u}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. may be considered.

Hereinafter, the above physical resources that can be considered in the NR system are described in more detail.

First, in regard to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^{\mu} N_{sc}^{RB}$ subcarriers on a frequency domain, each subframe consisting of 14·2μ OFDM symbols, but the present disclosure is not limited thereto.

In the NR system, a transmitted signal is described by one or more resource grids, consisting of $N_{RB}^{\mu} N_{sc}^{RB}$ subcarriers, and $2^{\mu} N_{symb}^{(\mu)}$ OFDM symbols, where $N_{RB}^{\mu} \leq N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k,l̄), where k=0, . . . , $N_{RB}^{\mu} N_{sc}^{RB}-1$ is an index on a frequency domain, and l̄=0, . . . , $2^{\mu} N_{symb}^{(\mu)}-1$ refers to a location of a symbol in a subframe. The index pair (k,l̄) is used to refer to a resource element in a slot, where l=0, . . . , $N_{symb}^{\mu}-1$.

The resource element (k,l̄) for the numerology μ and the antenna port p corresponds to a complex value $\alpha_{k,\bar{l}}^{(p,\mu)}$. When there is no risk for confusion or when a specific antenna port or numerology is not specified, the indexes p and μ may be dropped, and as a result, the complex value may be $\alpha_{k,\bar{l}}^{(p)}$ or $\alpha_{k,\bar{l}}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

Here, $N_{BWP,i}^{start}$ may be the common resource block where the BWP starts relative to the common resource block 0.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Operation of measuring characteristics of a beam forming signal received by the eNB or UE.

Beam determination: Operation of selecting a transmit (Tx) beam/receive (Rx) beam of the eNB or UE by the eNB or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS). Further, each BM procedure may include Tx beam sweeping for determining the Tx beam and Rx beam sweeping for determining the Rx beam.

Downlink Beam Management (DL BM)

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRI).

FIG. 7 illustrates an example of beamforming using a SSB and a CSI-RS.

As illustrated in FIG. 7, a SSB beam and a CSI-RS beam may be used for beam measurement. A measurement metric is L1-RSRP per resource/block. The SSB may be used for coarse beam measurement, and the CSI-RS may be used for fine beam measurement. The SSB may be used for both Tx beam sweeping and Rx beam sweeping. The Rx beam sweeping using the SSB may be performed while the UE changes Rx beam for the same SSBRI across multiple SSB bursts. One SS burst includes one or more SSBs, and one SS burst set includes one or more SSB bursts.

DL BM Related Beam Indication

A UE may be RRC-configured with a list of up to M candidate transmission configuration indication (TCI) states at least for the purpose of quasi co-location (QCL) indication, where M may be 64.

Each TCI state may be configured with one RS set. Each ID of DL RS at least for the purpose of spatial QCL (QCL Type D) in an RS set may refer to one of DL RS types such as SSB, P-CSI RS, SP-CSI RS, A-CSI RS, etc.

Initialization/update of the ID of DL RS(s) in the RS set used at least for the purpose of spatial QCL may be performed at least via explicit signaling.

Table 6 represents an example of TCI-State IE.

The TCI-State IE associates one or two DL reference signals (RSs) with corresponding quasi co-location (QCL) types.

TABLE 5

-- ASN1START
-- TAG-TCI-STATE-START

TABLE 5-continued

```
TCI-State ::=         SEQUENCE {
    tci-StateId       TCI-StateId,
    qcl-Type1         QCL-Info,
    qcl-Type2         QCL-Info
    ...
}
QCL-Info ::=          SEQUENCE {
    cell              ServCellIndex
    bwp-Id            BWP-Id
    referenceSignal   CHOICE {
        csi-rs            NZP-CSI-RS-ResourceId,
        ssb               SSB-Index
    },
    qcl-Type          ENUMERATED {typeA, typeB, typeC,
                                  typeD},
    ...
}
```
-- TAG-TCI-STATE-STOP
-- ASN1STOP In Table 5, bwp-Id parameter represents a DL BWP where the RS is located, cell parameter represents a carrier where the RS is located, and reference signal parameter represents reference antenna port(s) which is a source of quasi co-location for corresponding target antenna port(s) or a reference signal including the one. The target antenna port(s) may be CSI-RS, PDCCH DMRS, or PDSCH DMRS. As an example, in order to indicate QCL reference RS information on NZP CSI-RS, the corresponding TCI state ID may be indicated to NZP CSI-RS resource configuration information. As another example, in order to indicate QCL reference information on PDCCH DMRS antenna port(s), the TCI state ID may be indicated to each CORESET configuration. As another example, in order to indicate QCL reference information on PDSCH DMRS antenna port(s), the TCI state ID may be indicated via DCI.

Quasi-Co Location (QCL)

The antenna port is defined so that a channel over which a symbol on an antenna port is conveyed can be inferred from a channel over which another symbol on the same antenna port is conveyed. When properties of a channel over which a symbol on one antenna port is conveyed can be inferred from a channel over which a symbol on another antenna port is conveyed, the two antenna ports may be considered as being in a quasi co-located or quasi co-location (QC/QCL) relationship.

The channel properties include one or more of delay spread, Doppler spread, frequency/Doppler shift, average received power, received timing/average delay, and spatial RX parameter. The spatial Rx parameter means a spatial (reception) channel property parameter such as an angle of arrival.

The UE may be configured with a list of up to M TCI-State configurations within the higher layer parameter PDSCH-Config to decode PDSCH according to a detected PDCCH with DCI intended for the corresponding UE and a given serving cell, where M depends on UE capability.

Each TCI-State contains parameters for configuring a quasi co-location relationship between one or two DL reference signals and the DM-RS ports of the PDSCH.

The quasi co-location relationship is configured by the higher layer parameter qcl-Type1 for the first DL RS and qcl-Type2 for the second DL RS (if configured). For the case of two DL RSs, the QCL types are not be the same, regardless of whether the references are to the same DL RS or different DL RSs.

The quasi co-location types corresponding to each DL RS are given by the higher layer parameter qcl-Type of QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if a target antenna port is a specific NZP CSI-RS, the corresponding NZP CSI-RS antenna ports may be indicated/configured to be QCLed with a specific TRS in terms of QCL-TypeA and with a specific SSB in terms of QCL-TypeD. The UE receiving the indication/configuration may receive the corresponding NZP CSI-RS using the Doppler or delay value measured in the QCL-TypeA TRS and apply the Rx beam used for QCL-TypeD SSB reception to the reception of the corresponding NZP CSI-RS reception.

The UE may receive an activation command by MAC CE signaling used to map up to eight TCI states to the codepoint of the DCI field 'Transmission Configuration Indication'.

UL BM Procedure

A UL BM may be configured such that beam reciprocity (or beam correspondence) between Tx beam and Rx beam is established or not established depending on the UE implementation. If the beam reciprocity between Tx beam and Rx beam is established in both a base station and a UE, a UL beam pair may be adjusted via a DL beam pair. However, if the beam reciprocity between Tx beam and Rx beam is not established in any one of the base station and the UE, a process for determining the UL beam pair is necessary separately from determining the DL beam pair.

Even when both the base station and the UE maintain the beam correspondence, the base station may use a UL BM procedure for determining the DL Tx beam even if the UE does not request a report of a (preferred) beam.

The UM BM may be performed via beamformed UL SRS transmission, and whether to apply UL BM of a SRS resource set is configured by the (higher layer parameter) usage. If the usage is set to 'BeamManagement (BM)', only one SRS resource may be transmitted to each of a plurality of SRS resource sets in a given time instant.

The UE may be configured with one or more sounding reference symbol (SRS) resource sets configured by (higher layer parameter) SRS-ResourceSet (via higher layer signaling, RRC signaling, etc.). For each SRS resource set, the UE may be configured with K≥1 SRS resources (higher later parameter SRS-resource), where K is a natural number, and a maximum value of K is indicated by SRS capability.

In the same manner as the DL BM, the UL BM procedure may be divided into a UE's Tx beam sweeping and a base station's Rx beam sweeping.

FIG. 8 illustrates an example of an UL BM procedure using a SRS.

More specifically, (a) of FIG. 8 illustrates an Rx beam determination procedure of a base station, and (a) of FIG. 8 illustrates a Tx beam sweeping procedure of a UE.

FIG. 9 is a flow chart illustrating an example of an UL BM procedure using a SRS.

The UE receives, from the base station, RRC signaling (e.g., SRS-Config IE) including (higher layer parameter) usage parameter set to 'beam management' in S910.

Table 6 represents an example of SRS-Config information element (IE), and the SRS-Config IE is used for SRS transmission configuration. The SRS-Config IE contains a list of SRS-Resources and a list of SRS-Resource sets. Each SRS resource set means a set of SRS resources.

The network may trigger transmission of the SRS resource set using configured aperiodicSRS-ResourceTrigger (L1 DCI).

TABLE 6

```
-- ASN1START
-- TAG-MAC-CELL-GROUP-CONFIG-START
SRS-Config ::=                                       SEQUENCE {
    srs-ResourceSetToReleaseList                     SEQUENCE (SIZE(1..maxNrofSRS-
ResourceSets)) OF SRS-ResourceSetId                      OPTIONAL,    -- Need N
    srs-ResourceSetToAddModList                      SEQUENCE (SIZE(1..maxNrofSRS-
ResourceSets)) OF SRS-ResourceSet                        OPTIONAL,    -- Need N
    srs-ResourceToReleaseList                        SEQUENCE (SIZE(1..maxNrofSRS-
Resources)) OF SRS-ResourceId                            OPTIONAL,    -- Need N
    srs-ResourceTo AddModList                        SEQUENCE (SIZE(1..maxNrofSRS-
Resources)) OF SRS-Resource                              OPTIONAL,    -- Need N
    tpc-Accumulation                                 ENUMERATED {disabled}
    ...
}
SRS-ResourceSet ::=                                  SEQUENCE {
    srs-ResourceSetId                                SRS-ResourceSetId,
    srs-ResourceIdList                               SEQUENCE (SIZE(1..maxNrofSRS-
ResourcesPerSet)) OF SRS-ResourceId                      OPTIONAL,    -- Cond Setup
    resourceType                                     CHOICE {
        aperiodic                                    SEQUENCE {
            aperiodicSRS-ResourceTrigger                 INTEGER (1..maxNrofSRS-
TriggerStates-1),
            csi-RS                                       NZP-CSI-RS-ResourceId
            slotOffset                                   INTEGER (1..32)
            ...
        },
        semi-persistent                              SEQUENCE {
            associatedCSI-RS                             NZP-CSI-RS-ResourceId
            ...
        },
        periodic                                     SEQUENCE {
            associatedCSI-RS                             NZP-CSI-RS-ResourceId
            ...
        }
    },
    usage                                            ENUMERATED {beamManagement,
codebook, nonCodebook, antennaSwitching},
```

TABLE 6-continued

```
alpha                                    Alpha
p0                                       INTEGER (-202..24)
pathlossReferenceRS                      CHOICE {
    ssb-Index                                SSB-Index,
    csi-RS-Index                             NZP-CSI-RS-ResourceId
SRS-SpatialRelationInfo ::= SEQUENCE{
    servingCellId                        ServCellIndex
    OPTIONAL, -- Need S
    referenceSignal                      CHOICE {
        ssb-Index                            SSB-Index,
        csi-RS-Index                         NZP-CSI-RS-ResourceId,
        srs                                  SEQUENCE {
            resourceId                           SRS-ResourceId,
            uplinkBWP                            BWP-Id
        }
    }
}
}
SRS-ResourceId ::=                       INTEGER (0..maxNrofSRS-Resources-1)
```

In Table 6, usage refers to a higher layer parameter to indicate whether the SRS resource set is used for beam management or is used for codebook based or non-codebook based transmission. The usage parameter corresponds to L1 parameter 'SRS-SetUse'. 'spatialRelationInfo' is a parameter representing a configuration of spatial relation between a reference RS and a target SRS. The reference RS may be SSB, CSI-RS, or SRS which corresponds to L1 parameter 'SRS-SpatialRelationInfo'. The usage is configured per SRS resource set.

The UE determines the Tx beam for the SRS resource to be transmitted based on SRS-SpatialRelation Info contained in the SRS-Config IE in S920. The SRS-SpatialRelation Info is configured per SRS resource and indicates whether to apply the same beam as the beam used for SSB, CSI-RS, or SRS per SRS resource. Further, SRS-SpatialRelationInfo may be configured or not configured in each SRS resource.

If the SRS-SpatialRelationInfo is configured in the SRS resource, the same beam as the beam used for SSB, CSI-RS or SRS is applied for transmission. However, if the SRS-SpatialRelationInfo is not configured in the SRS resource, the UE randomly determines the Tx beam and transmits the SRS via the determined Tx beam in S930.

More specifically, for P-SRS with SRS-ResourceConfig-Type' set to 'periodic':

i) if SRS-SpatialRelationInfo is set to SSB/PBCH,' the UE transmits the corresponding SRS resource with the same spatial domain transmission filter (or generated from the corresponding filter) as the spatial domain Rx filter used for the reception of the SSB/PBCH; or ii) if SRS-SpatialRelationInfo is set to 'CSI-RS,' the UE transmits the SRS resource with the same spatial domain transmission filter used for the reception of the periodic CSI-RS or SP CSI-RS; or iii) if SRS-SpatialRelationInfo is set to 'SRS,' the UE transmits the SRS resource with the same spatial domain transmission filter used for the transmission of the periodic SRS.

Even if 'SRS-ResourceConfigType' is set to SP-SRS' or 'AP-SRS,' the beam determination and transmission operations may be applied similar to the above.

Additionally, the UE may receive or may not receive feedback for the SRS from the base station, as in the following three cases in S940.

i) If Spatial_Relation_Info is configured for all the SRS resources within the SRS resource set, the UE transmits the SRS with the beam indicated by the base station. For example, if the Spatial_Relation_Info indicates all the same SSB, CRI, or SRI, the UE repeatedly transmits the SRS with the same beam. This case corresponds to (a) of FIG. 8 as the usage for the base station to select the Rx beam.

ii) The Spatial_Relation_Info may not be configured for all the SRS resources within the SRS resource set. In this case, the UE may perform transmission while freely changing SRS beams. That is, this case corresponds to (b) of FIG. 8 as the usage for the UE to sweep the Tx beam.

iii) The Spatial_Relation_Info may be configured for only some SRS resources within the SRS resource set. In this case, the UE may transmit the configured SRS resources with the indicated beam, and transmit the SRS resources, for which Spatial_Relation_Info is not configured, by randomly applying the Tx beam.

In a next-generation wireless communication system (e.g., NR system), operations for an uplink transmission beam of the UE may be supported. As an example, an operation of determining the uplink transmission beam of the UE in Frequency Range 1 (FR1) and/or Frequency Range 2 (FR2) areas in Table 2 described above may be considered.

For example, in order to determine a specific uplink transmission beam, a higher layer parameter (e.g., RRC parameter) is configured to configure association information (or linkage information) with a value of the corresponding parameter. The association information may be configured based on an identifier (e.g., CSI-RS resource ID), an identifier (e.g., SSB ID, SSB index) of the SSB, and/or an identifier (e.g., SRS resource ID) of the SRS resource. The UE may determine, as the uplink transmission beam, a beam based on, i.e., determined (or identified) by the association information. As an example, it may be defined or limited that the association information based on the identifier of the CSI-RS resource and/or the identifier of the SSB is configured when a beam correspondence is established and association information based on the identifier of the SRS resource is configured when the beam correspondence of the UE is not completely supported.

In the next-generation wireless communication system, a method in which the BS configures (or indicates) the uplink transmission beam of the corresponding UE by using a specific unit based on implementation of the UE, etc., needs to be considered. For example, a method needs to be considered in which the BS configures and/or indicates the uplink transmission beam of the corresponding UE in a specific antenna group unit of the UE. Further, a method may need to be considered in which the BS configures and/or controls whether to receive a DL RS (e.g., CSI-RS resource ID, SSB ID/index) corresponding to the higher layer parameter (e.g., RRC parameter spatialRelationInfo) value and/or transmission of a UR RS (e.g., SRS resource ID) corresponding to the higher layer parameter value, based on a specific antenna group unit of the UE.

By considering this case, in the next-generation wireless communication system, a definition of a panel which becomes an actual transmission unit or reception unit of the UE and a configuration method related to the panel need to be supported.

The 'panel' referred to in the present disclosure may be modified to, and interpreted/applied as 'at least one panel', 'a plurality of panels', or 'panel group' (having similarity and/or a common value (having a specific characteristic viewpoint (e.g., Timing Advance (TA), Power control parameter, etc.)). Further, the 'panel' referred to in the present disclosure may be modified to, and interpreted/applied as 'at least one antenna port', 'a plurality of antenna ports', 'at least one uplink resource', 'a plurality of uplink resources, 'antenna port group', 'uplink resource group', or uplink resource set' (having a specific characteristic viewpoint (e.g., TA, Power control parameter, etc.)). In addition, the 'panel' referred to in the present disclosure may be modified, and interpreted/applied to 'at least one beam', 'a plurality of beams', 'at least one beam group', or 'at least one beam set' (having similarity and/or a common value in a specific characteristic viewpoint (e.g., TA, Power control parameter, etc.).

Further, the 'panel' referred to in the present disclosure may be defined as a unit for configuring the transmission beam and/or reception beam by the UE. For example, a transmission panel' may be defined as a unit in which a plurality of candidate transmission beams may be generated, but only one beam among the candidate transmission beams may be used in transmission at a specific timing. As an example, only one transmission beam (e.g., spatial relation information RS) may be used per transmission panel for transmission of a specific uplink signal and/or channel.

Further, in the present disclosure, the 'panel' may refer to 'at least one antenna port', 'a plurality of antenna ports', 'antenna port group', 'uplink resource group', or 'uplink resource set' of which uplink synchronization is common (or similar). In this case, the 'panel' may be modified to, and interpreted/applied as a generalized expression 'Uplink Synchronization Unit (USU)'. Further, in the present disclosure, the 'panel' may be modified to, and interpreted/applied as a generalized expression 'Uplink Transmission Entity (UTE)'.

The 'uplink resource (or resource group)' may be modified, and interpreted/applied as a PUSCH/PUCCH/SRS/PRACH resource (or a resource group, a resource set). Further, the modification, and interpretation/application may be applied even inversely, of course.

Further, in the present disclosure, the 'antenna (or antenna port)' may represent a physical or logical antenna (or antenna port). In other words, the 'panel' referred to in the present disclosure may be variously interpreted as 'group of a UE antenna element', group of a UE antenna port', 'group of a UE logical antenna', etc. For example, which physical/logical antennas (or antenna ports) are to be bound and mapped to one panel may be configured in various schemes by considering a location/distance/correlation between antennas, an RF configuration, and/or an antenna (port) virtualization scheme. Such a mapping process may vary depending on UE implementation. Further, the 'panel' referred to in the present disclosure may be modified, and interpreted/applied to 'a plurality of panels' or 'panel group' (having similarity and/or a common value in a specific characteristic viewpoint).

When the panel as described above is considered, panel unit activation or deactivation may be considered based on a common understanding of whether the panel between the BS and the UE is used. Therefore, there is an effect that power control may be efficiently performed. Further, since the BS may perform scheduling in units of the panel, an effect that the BS may control interference (e.g., uplink interference, etc.) in a desired direction (or beam region) may also be obtained in terms of a cell operation.

The UE may report the information related to the panel to the BS in the form of a UE capability. Further, the UE may also transmit the information related to the panel to the BS through semi-static or dynamic reporting. The BS may receive the information related to the panel from the UE to perform a specific control signaling of the panel unit, and may configure and/or indicate the related operation of the UE.

For example, when four SRS resource sets (e.g., RRC parameter usage is configured to 'BeamManagement') configured for a beam management (BM) usage are configured to the UE, each SRS resource set may be configured and/or defined to correspond to each panel of the UE. As an example, when four SRS resource sets are represented by SRS resource sets A, B, C, and D, and the UE implements a total of four (transmission) panels, each SRS resource set corresponds to one (transmission) panel to perform the SRS transmission.

As an example, implementation of the UE shown in Table 7 may be possible.

TABLE 7

| Maximum number of SRS resource sets across all time domain behavior (periodic/semi-persistent/aperiodic) | Additional constraint on the maximum of SRS resource sets per supported time domain behavior (periodic/semi-persistent/aperiodic) |
|---|---|
| 1 | 1 |
| 2 | 1 |
| 3 | 1 |
| 4 | 2 |
| 5 | 2 |
| 6 | 2 |
| 7 | 4 |
| 8 | 4 |

Referring to contents of Table 7, when the UE reports (or transmits), to the BS, UE capability information in which the number of SRS resource sets which may be supported by the UE itself is 7 or 8, the corresponding UE may be configured with up to a total of four SRS resource sets (for the BM usage) from the BS. In this case, as an example, the UE may also be defined, configured, and/or indicated to perform uplink transmission by making each of the SRS resource sets (for the BM usage) correspond to each panel (transmission panel and/or reception panel) of the UE. That is, an SRS resource set(s) for a specific usage (e.g., BM usage) configured to the UE may be defined, configured, and/or indicated to correspond to the panel of the UE. As an example, when the BS (implicitly or explicitly) configures and/or indicates, to the UE, a first SRS resource set in relation to the uplink transmission (configured for the BM usage), the corresponding UE may recognize to perform the uplink transmission by using a panel related (or corresponding) to the first SRS resource set.

Further, like the UE, when the UE that supports four panels transmits each panel to correspond to one SRS resource set for the BM usage, information on the number of SRS resources configurable per SRS resource set may also be include in the capability information of the UE. Here, the number of SRS resources may correspond to the number of transmittable beams (e.g., uplink beams) per panel of the UE. For example, the UE in which four panels are implemented may be configured to perform the uplink transmission in such a manner that two uplink beams correspond to two configured RS resources, respectively for each panel.

The present disclosure proposes a method for performing, by the UE, the panel unit configuration and/or indication when performing the uplink transmission, in particular, when transmitting the uplink data channel (e.g., PUSCH). That is, the present disclosure proposes a method for configuring and/or indicating a panel and/or a beam for the corresponding PUSCH transmission when the BS schedules PUSCH transmission of the UE.

A PUSCH transmission/reception procedure in the next-generation wireless communication system may be illustrated in FIG. 10.

FIG. 10 illustrates an example of a PUSCH transmission/reception procedure to which a method proposed in the present disclosure is applicable. FIG. 10 is just for convenience of the description and does not limit the scope of the present disclosure.

Referring to FIG. 10, a case where the BS and the UE perform PUSCH transmission/reception based on the panel unit and/or the beam unit is assumed.

The UE may transmit (or report) UE capability information to the BS (S1005). Here, the corresponding UE capability information may include information on a UE capability related to the PUSCH transmission, information related to a panel configuration of the UE, information related to a beam configuration of the UE, and the like. For example, the corresponding UE capability information may include information on the number of activatable panels of the UE, information on the maximum number of panels available for one transmission, information on the number of beams constituting the panel of the UE, and the like.

The UE may receive, from the BS, configuration information related to the PUSCH transmission (S1010). In this case, the configuration information may be transferred through higher layer signaling (e.g., RRC signaling, etc.). Here, the configuration information may include configuration information (e.g., PUSCH configuration, etc.) for the PUSCH transmission, configuration information related to the panel and/or beam for the PUSCH transmission, and the like.

The UE may receive, from the BS, PUSCH scheduling information (S1015). In this case, the scheduling information may be transferred through downlink control information (DCI) and/or MAC-CE. For example, the DCI may include Identifier for DCI formats, UL/Supplementary uplink (SUL) indicator, Bandwidth part indicator, Frequency domain resource assignment, Time domain resource assignment, Frequency hopping flag, Modulation and coding scheme (MCS), SRS resource indicator (SRI), Precoding information and number of layers, Antenna port(s), SRS request, DMRS sequence initialization, Uplink Shared Channel (UL-SCH) indicator, and the like. Further, configured SRS resources in an SRS resource set related to a higher layer parameter 'usage' may be indicated by an SRI field included in the DCI. Further, 'spatialRelationInfo' may be configured for each SRS resource and a value of 'spatialRelationInfo' may be one of {CRI, SSB, and SRI}.

The US may transmit, to the BS, the PUSCH based on the PUSCH transmission related configuration information and the PUSCH scheduling information (S1020). In this case, the corresponding PUSCH may be transmitted by considering the panel unit and/or the beam unit.

In relation to a PUSCH transmission scheme in the next-generation wireless communication system, codebook based transmission (CB transmission) and non-codebook based transmission (NCB transmission) may be supported. The UE may perform the CB transmission when a higher layer parameter txConfig in PUSCH-Config is configured to 'codebook' and performs the NCB transmission when the txConfig is configured to 'nonCodebook'. When the txConfig is not configured, the PUSCH transmission may be based on one PUSCH antenna port and this may be triggered by DCI format 0_0.

First, the codebook based uplink transmission will be described in detail.

In the case of the codebook based transmission, the UE may determine a PUSCH transmission precoder based on an SRS resource indicator (SRI), a transmit precoding matrix indicator (TPMI), and a transmit rank indicator (TRI). Here, the SRI, the TPMI, and the TRI may be given by SRS resource indicator field information and Precoding information and number of layers information included in the DCI field. The TPMI may be used for representing a precoder to be applied through antenna port {0 ... v−1} corresponding to an SRS resource selected by the SRI when multiple SRS resources are configured or one SRS resource is configured or the TPMI may be used for representing a precoder to be applied through antenna port {0 ... v−1} corresponding to the SRS resource.

A transmit precoder may be selected in an uplink codebook having the same multiple antenna ports as a higher layer parameter nrofSRS-Ports of SRS-Config. When the UE is configured to have the higher layer parameter txConfig configured to 'codebook', the UE may be constituted by at least one SRS resource. SRI indicated in slot n may be related to most recent transmission of an SRS resource before the PDCCH carrying SRI before slot n, i.e., an SRS resource identified by the SRI.

Further, in the case of the codebook based transmission, the UE may be constituted by a single SRS resource set and only one SRS resource may be indicated based on the SRI within the SRS resource set. The maximum number of SRS resources configured for the codebook based transmission may be 2. When aperiodic (AP)-SRS is configured to the UE, an SRS request field of the DCI may trigger transmission of the AP-SRS resource. Further, when multiple SRS resources are configured, the UE may expect that the higher layer parameter nrofSRS-Ports of SRS-Config will be configured as the same value in all SRS resources and the higher layer parameter resourceType of SRS-ResourceSet will be configured as the same value with respect to all SRS resources.

Next, the non-codebook based uplink transmission will be described in detail.

In the case of the non-codebook based transmission, the UE may determine the PUSCH precoder and the transmit rank thereof based on wideband SRI by the SRI field from the DCI. The UE may use one or multiple SRS resources for the SRS transmission and the number of SRS resources which may be configured to the UE for simultaneous transmission in the same RB may be the UE capability. Further, only SRS port may be configured with respect to each SRS resource. Further, when the higher layer parameter usage of SRS-Config is configured to 'nonCodebook', only one SRS resource set may be configured. The maximum number of SRS resources which may be configured for the non-codebook based uplink transmission is 4. Further, the SRI indicated in slot n may be related to the most recent transmission of the SRS resource before the PDCCH carrying the SRI before slot n, i.e., the SRS resource identified by the SRI.

In the case of the non-codebook based transmission, the UE may calculate a precoder to be used for transmission of precoded SRS based on measurement of a related NZP CSI-RS resource. The UE may be configured with only one NZP CSI-RS resource with respect to the SRS resource set. Further, in the case of the non-codebook based transmission, the UE does not expect that all spatialRelationInfo for associated CSI-RS and SRS resources in SRS-Config for the SRS resource set will be configured. Further, in the case of the non-codebook based transmission, when at least one SRS resource is configured, the UE may be scheduled by DCI format 0_1.

The present disclosure proposes a panel and/or beam unit configuration and/or indication method in relation to the PUSCH transmission/reception between the BS and the UE. As an example, methods and/or examples described below in the present disclosure may correspond to specific methods and/or examples of respective steps in FIG. 10 described above. Further, the methods and/or examples described below may be distinguished for convenience of description, and may be applied independently, or may be applied through mutual combination.

Hereinafter, a panel and/or beam unit configuration and/or indication method which may be applied to the codebook-based (CB based) UL transmission and/or non codebook-based (NCB-based) UL transmission will be described. As an example, as described above, in the case of the codebook-based UL transmission and/or non-codebook-based UL transmission, a single SRS resource set or multiple SRS resource sets may be configured for the corresponding usage.

The SRS resource set configured for the usage of the codebook based UL transmission and/or non-codebook based UL transmission and the SRS resource set for the BM usage may be independently configured without a predetermined connection relationship. Here, since the SRS resource set for the BM usage may correspond to the panel o the UE as mentioned above, the connection relationship may mean a connection relationship between the SRS resource set configured for the usage of the codebook based UL transmission and/or non-codebook based UL transmission and the panel of the UE. When the SRS resource set configured for the usage of the codebook based UL transmission and/or non-codebook based UL transmission and the SRS resource set for the BM usage are independently configured as such, the BS may not know from which UE panel the PUSCH is transmitted in spite of following a form of performing (or implementing) the PUSCH transmission from a specific single panel. As an example, when two SRS resources are configured within the single SRS resource set configured for the usage of the codebook based UL transmission, to which panel(s) of four panels the UE performs is to perform transmission of a first SRS resource and a second SRS resource by mapping may be an implementation matter of the UE.

By considering such a point, the present disclosure proposes a method for configuring (and/or indicating) an association relationship (and/or a linkage) between the SRS resource set(s) for the usage of the codebook based and/or non-codebook based PUSCH transmission and the SRS resource(s) within each SRS resource set in relation to the SRS resource set(s) according to the configuration of the SRS resource set(s) for the specific BM usage and the SRS resource(s) within each SRS resource set. As an example, the association relationship may be configured through separate higher layer signaling or may be based on a predefined (or predetermined or preconfigured) rule or mechanism. Through this, the BS may configure (or indicate or schedule) (transmission) panel-specific UL transmission of the UE.

In the following description, the number of SRS resource sets configured for the usage of the codebook based UL transmission and/or non-codebook based UL transmission may be 2 or more, and for convenience of description, a case where two SRS resource sets are configured for the usage of the codebook based UL transmission and/or non-codebook based UL transmission is assumed. Two SRS resource sets are referred to as SRS resource set 1 and SRS resource set 2, respectively.

(Panel Unit and/or Beam Unit Based PUSCH Transmission/Reception Method)

Signaling related to the linkage relationship between the SRS resource set(s) configured for the usage of the codebook based UL transmission and/or non-codebook based UL transmission, and the SRS resource set(s) configured for the BM usage may be configured, defined, or indicated. Here, the SRS resource set(s) configured for the BM usage may correspond to the panel(s) of the UE as described above. In other words, the BS may configure or indicate, to the UE, information indicating the linkage relationship between the panel of the UE and the SRS resource(s) related to the PUSCH transmission through signaling.

For example, a method for transferring the information related to the linkage through the higher layer signaling (e.g., RRC signaling) and/or Medium Access Control-Control Element (MAC-CE) based signaling may be considered. The corresponding scheme may be related to step S1010 and/or step S1015 in FIG. 10. In a state in which a set of candidate linkage configurations connected to the linkage is preconfigured through the higher layer signaling, a semi-dynamic control scheme such as which candidate linkage configuration is activated or deactivated through the MAC-CE based signaling, etc., may be considered. Further, a method for directly providing or updating a configuration related to the linkage by the MAC-CE based signaling itself may also be considered.

Specifically, the first SRS resource set for the codebook based UL transmission and/or non-codebook based UL transmission may be associated with SRS resource set A (e.g., penal A among the panels of the UE) for the BM usage and the second SRS resource set may be associated with SRS resource set C (e.g., panel C among the panels of the UE) for the BM usage. In other words, the panel of the UE related to the codebook based UL transmission and/or non-codebook based UL transmission may be configured and/or indicated through the higher layer signaling and/or MAC-CE based signaling. In this case, the linkage relationship itself may be updated, activated, deactivated, or indicated by the MAC-CE based signaling and/or dynamic signaling (e.g., DCI).

For example, when the PUSCH of the codebook based UL transmission and/or non-codebook based UL transmission is scheduled, indication information related to the first SRS resource set and/or the second SRS resource set may be transferred through a specific field (i.e., a specific field(s) within UL related DCI) of DCI (e.g., DCI format 0_1) for the corresponding scheduling. The corresponding scheme may be related to step S1010 and/or step S1015 in FIG. 10. As an example, the indication information may be indicated by a Transmission Configuration Indicator (TCI) field within the DCI. Alternatively, in the case of configured grant based PUSCH transmission, the indication information may be configured through the higher layer parameter. Further, in relation to the SRS resource set indicated by the indication information, the BS indicates the SRS(s) indicator to the UE together, and as a result, the corresponding UE may determine (or select) a final SRI(s).

Further, even when only a single SRI field exists within the DCI, each state and/or codepoint within the specific field may be used for configuring and/or indicating the linkage relationship. As an example, the state and/or the codepoint may be preconfigured based on the higher layer signaling (and/or MAC-CE based signaling), and updated, activated, or deactivated (within a preconfigured parameter/value set) through the MAC-CE based signaling.

Through such a scheme, the BS may perform, to the UE, a panel unit indication (e.g., an SRS resource set unit indication) of the UE and/or a beam unit indication (e.g., SRI(s) within the indicated SRS resource set) within the panel in relation to the PUSCH transmission. In other words, the UE may perform the panel unit and/or beam unit PUSCH transmission based on the indication described above.

The above-described proposal scheme may be configured (or defined or indicated) to be applicable when a time-domain behavior of the SRS is aperiodic, semi-persistent, and/or periodic. In other words, the above-described proposal scheme may be configured and/or defined to be supported with respect to at least one of three types of time-domain behaviors.

When a PUSCH transmission/reception method based on the SRS resource set unit configuration and/or indication is generalized, the generalized method may be described as in the following example.

For example, assumed is a case where a linkage relationship between the SRS resource set for the PUSCH transmission and the SRS resource set (e.g., a unit corresponding to the panel of the UE) for the BM usage through i) a specific SRI field(s) or ii) a panel and/or beam indication related specific field (e.g., may be referred to as a UL TCI field, etc.) within specific UL DCI is configured (or indicated) through the RRC signaling and/or MAC-CE and/or DCI. In this case, a scheme may be considered, which enables an individual or local indicator(s) (e.g., SRI, UL RCI state, etc.) within the field to perform dynamic selection only with respect to an individual or local indicator within the corresponding linked SRS resource set(s) for the BM usage. As an example, a value indicated by the corresponding field may be configured or defined to be related to a pre-linked SRS resource set(s) for the BM usage. Of course, in the scheme may be applied to the configured grant based PUSCH transmission based on not the UL DCI but the higher layer parameter related to the configured grant.

In respect to the scheme, an operation may be considered in which one specific panel corresponds to each SRS resource set for the BM usage in an implementation situation of the UE (e.g., a UE that supports four panels), and each of multiple UL beams within the corresponding panel is applied to the individual or local SRS resource within the corresponding SRS resource set, and transmitted or swept. In this case, a method may be considered in which when the PUSCH is scheduled, qualities of SRSs transmitted from two specific panels among panels (e.g., four panels) supported by the UE are relatively more excellent and the SRSs are linked to a panel(s) which become(s) a candidate of the PUSCH scheduling. To this end, a configuration (and/or indication) operation may be applied, which links only two specific SS resource sets for the BM usage to a specific field within the corresponding UL DCI.

When two SRS resource sets down-selected or linked as such are SRS resource set A and SRS resource set C as in the example described above, dynamic selection may be configured to be made only for the individual or local beams within SRS resource set A and SRS resource set C through the corresponding field (i.e., panel/beam related scheduling field) of the corresponding UL DCI. Through this, an effect may be obtained, which enables dynamic beam selection within an indicated (or selected) panel while reducing overhead on a DCI bit size (bit-width). Further, information of the linked (or associated) SRS resource set A and SRS resource set C may be designed to be updated, activated, or deactivated through the higher layer signaling and/or the MAC-CE based signaling, and a panel selection related operation based on the corresponding scheme may be excluded from DCI overhead, and as a result, an effect that control channel overhead may be reduced may be obtained.

When the PUSCH transmission/reception method based on the SRS resource set unit configuration and/or indication is further generalized, the further generalized method may be described as in the following example.

For example, assumed is a case where a linkage relationship between the SRS resource set for the PUSCH transmission and the SRS resource set (e.g., a unit corresponding to the panel of the UE) for the BM usage through i) a specific SRI field(s) or ii) a panel and/or beam indication related specific field (e.g., may be referred to as a UL TCI field, etc.) within specific UL DCI is configured (or indicated) through the RRC signaling and/or MAC-CE and/or DCI. In this case, a scheme may b e considered, which enables the individual or local indicator(s) (e.g., SRI, UL RCI state, etc.) within the field to perform dynamic selection only for a corresponding linked (higher) reference signal (RS) for the BM usage (i.e., related to the BM) and/or an individual or local reference signal identifier (RS ID) and/or channel identifier (channel ID) within a set(s) of the channels. Here, the set of the (higher) reference signal (RS) for the BM usage and/or the set(s) of the channels may be defined or configured to correspond to the panel of the UE similarly to the SRS resource set(s) for the BM usage.

As an example, the UE may apply the indicated panel and/or beam to the PUSCH transmission. When a DL signal and/or channel is linked (or indicated) as a reference of the PUSCH transmission, a UL transmission beam corresponding (or reciprocal) to the corresponding DL reception beam may be configured and/or defined to be applied to the PUSCH transmission.

The set(s) of the reference signals and/or the set(s) of the channels for the (BM usage) may be related to the panel unit and/or beam unit indication of the UE, and particularly, defined, configured, or indicated to include at least one among the following examples. In the following examples, the group may be replaced with the set, and one or more examples may be combined and applied.

As an example, the set(s) of the reference signals and/or the set(s) of the channels may include a specific group of the CSI-RS resource(s) and/or a CSI-RS resource set(s). In other words, the set(s) of the corresponding reference signals may include a unit (e.g., CSI-RS resource setting) of grouping a specific CSI-RS resource(s). And/or the specific group may be limitedly constituted only by a CSI-RS resource(s) for a tracking reference signal (TRS) usage in which a higher space QCL reference is configured. And/or, when a CSI-RS resource(s) for a DL CSI acquisition usage is constituted by the specific group, the case may be limited only to a case where the CSI-RS resource(s) includes a spatial QCL reference RS(s).

As another example, the set(s) of the reference signals and/or the set(s) of the channels may include a specific group constituted by a synchronization signal block (SSB) (identifier (ID)(s). In this case, it may be limited or allowed that all SSBs which may be included in the specific group are SSBs configured for the BM usage. Here, the SSB configured for the BM usage may mean an SSB configured in at least one resource setting for DL reporting related to the BM.

As yet another example, the set(s) of the reference signals and/or the set(s) of the channels may include a specific group constituted by a control resource set (CORESET) (identifier (ID)(s). As an example, it may be limited or allowed that the control resource set is only linked to at least one specific search space configuration. And/or, an identifier(s) of the search space configuration may also become the set(s) of the reference signals and/or the set(s) of the channels. Information of an individual control resource set and the corresponding associated panel and/or beam may be configured, applied, and/or indicated in association with the identifier(s) of the search space configuration.

As yet another example, the set(s) of the reference signals and/or the set(s) of the channels may include a specific group constituted by a PUCCH resource (identifier (ID)(s). As an example, as being configured (or associated, indicated) by an individual specific PUCCH resource ID(s), the UE may be configured to perform the codebook based and/or non-codebook based PUSCH transmission based on a configuration including beam information applied to the corresponding PUCCH resource ID(s). And/or, as being configured (or associated, indicated) by a specific set unit in which a preconfigured (or defined) specific PUCCH resource ID(s) is grouped, the UE may be configured to perform the codebook based and/or non-codebook based PUSCH transmission based on a configuration including the beam information applied to the corresponding PUCCH resource ID(s). And/or, by a default configuration, an operation may be configured or defined, in which a predetermined PUCCH resource (e.g., a PUCCH resource corresponding to a lowest or highest index) is linked to the codebook based and/or non-codebook based PUSCH transmission by default. Here, the default configuration may be applied to a case where there is no reference signal set(s) and/or channel set(s) associated with the codebook based and/or non-codebook based PUSCH transmission, a case where a specific (ambiguous) interval is configured, etc.

When a (DL and/or UL related) reference signal set(s) and/or channel set(s) are/is linked (or configured, indicated) to the codebook based and/or non-codebook based PUSCH transmission based on the above-described schemes, the UE may be configured to perform the PUSCH transmission, based on a panel applied to previous reception and/or a panel applied to previous transmission, through a panel corresponding thereto. Hereinafter, the corresponding scheme is described based on the DL related reference signal set(s) and/or channel set(s), but this is just for convenience of description, and the scheme described below may also be extensively applied to the UL related reference signal set(s) and/or channel set(s), of course.

For example, as in the examples, when the DL related reference signal set(s) and/or channel set(s) is linked (or configured, indicated) to the PUSCH transmission, the UE may be defined (or configured, indicated) to perform panel unit and/or beam unit selective UL transmission during subsequent PUSCH scheduling, based on a (reception) panel of a specific UE applied during receiving, through a (transmission) panel of the UE corresponding (i.e., reciprocal) thereto.

Based on the (reception) panel, the (transmission) panel of the UE corresponding thereto may mean a panel for a UL transmission usage associated (or implemented), when the UE implements a specific DL receiving panel, so as to perform transmission in which beam correspondence (and/or panel correspondence) is maintained (to a specific predetermined or preconfigured level) with respect to the implementation of the panel. As an example, the UE may be implemented in the form of a specific transmission/reception panel in which both DL reception and UL transmission are performed with the same specific panel.

Further, when the DL related reference signal set(s) and/or channel set(s) are/is linked (or configured, indicated) to the PUSCH transmission, the UE may be defined (or configured, indicated) to apply the corresponding indicated DL related reference signal to a pathloss compensation operation during power control. As an example, the pathloss compensation operation may be included in an open-loop power control process related to the PUSCH transmission.

And/or, the DL related reference signal associated with the corresponding indicated DL channel (e.g., specific CORESET(s)) may be defined (or configured, indicated) to be applied to the pathloss compensation operation during the power control. Here, the DL related reference signal may be a reference signal used for receiving the corresponding DL channel, and may include, for example, a DMRS for CORESET(s) (or QCLed). Further, the pathloss compensation operation may be included in the open-loop power control process related to the PUSCH transmission.

And/or, a method may be considered, in which a structure of indicating the SRI by the DCI is maintained, and the DL related reference signal set(s) and/or channel set(s) configures (and/or indicates) an (additional linkage (or association) relationship to an SRS resource set level for the usage of the codebook based and/or non-codebook based uplink transmission. As an example, the linkage (or association) relationship may be configured and/or indicated through the higher layer signaling (e.g., RRC signaling) and/or MAC-CE based signaling. In this case, an operation may be defined (or configured, indicated) in which the UE performs the uplink transmission by using a (corresponding) beam and/or panel applied to reception of the corresponding reference signal set(s) and/or channel set(s).

For example, based on the above-described scheme of configuration and/or indication, the corresponding UE may transmit the PUSCH and/or SRS based on (the SRS resource(s) within) the associated SRS resource set(s) by using the (corresponding) beam and/or panel applied to reception of the DL reference signal set(s) and/or channel set(s). As an example, when the first SRS resource set and the second SRS resource set are configured for the codebook based PUSCH transmission and/or non-codebook based PUSCH transmission, it may be configured and/or indicated that the first SRS resource set is associated (or linked) to SSB #3 (i.e., an SSB corresponding to index/ID #3) and the second RS resource set is associated with SSB #7 (i.e., an SSB corresponding to index/ID #7). As another example, when the first SRS resource set and the second SRS resource set are configured for the SRS transmission, it may be configured and/or indicated that the first SRS resource set is associated with SSB #3 and the second SRS resource set is associated with SSB #7.

When the linkage (or association relationship) as in the example is configured and/or indicated, the UE may transmit the PUSCH and/or SRS through the configured SRS resource(s) within the first SRS resource set by using a (transmission) panel corresponding to a (best, preferred) (reception) panel applied when receiving SSB #3. Here, the reception panel and/or transmission panel of the UE may be one same transmission/reception panel.

Further, in each of the SRS resource(s) within the indicated SRS resource set, spatial relation information (e.g., RRC parameter spatial relation info, etc.) may be configured to a unique resource level. As an example, when an independent CSI-RS resource indicator (CRI) is configured for each SRS resource, the UE may be configured to perform transmission by using an uplink beam corresponding (i.e., reciprocal) to corresponding CRI reception when transmitting the PUSCH and/or SRS through each corresponding SRS resource. Here, a separate (or additional) linkage of SSB #3 is assigned for each SRS resource set, so that the UE may be configured (and/or indicated) to determine a (best, preferred) beam for CSI-RS reception for the SRI within the (transmission) panel of the UE corresponding to the SRS resource set, and perform the transmission of the PUSCH and/or SRS with a transmission beam corresponding to the determined beam.

The above-described example may be applied by replacing the first SRS resource set with the second SRS resource set and replacing SSB #3 with SSB #7, and extended to an example related to multiple SRS resource sets in addition to two cases.

In other words, the linkage (or association) relationship of the above-described SRS resource set level may be interpreted as panel selection (and/or panel association) of the UE. Further, the linkage (or association) relationship of the SRS resource level within the SRS resource set may be interpreted as beam selection (and/or beam association) within the selected (and/or associated) panel.

And/or, the beam (and/or beam association) relationship may be configured at an SRS resource level in addition to the SRS resource set level. As an example, when the first SRS resource set and the second SRS resource set are configured for the codebook based PUSCH transmission, the non-codebook based PUSCH transmission, and/or the SRS transmission, it may be configured and/or indicated that the first SRS resource set is associated with SSB #3 and the second SRS resource set is associated with SSB #7. In this case, it may be configured and/or indicated that SRS resource #4 within the first SRS resource set is associated with CRI #11 and SRS resource #5 within the first SRS resource set is associated with CRI #12. Further, it may be configured and/or indicated that SRS resource #8 within the second SRS resource set is associated with CRI #11 and SRS resource #9 within the first SRS resource set is associated with CRI #14. The UE may transmit a codebook based PUSCH, a non-codebook based PUSCH, and/or an SRS by using the associated resource set(s) and the associated SRS resource(s).

As in the example, CRI #11 may be commonly configured in a specific SRS resource (e.g., SRS resource #4) within the first SRS resource set and redundantly configured in a specific SRS resource (e.g., SRS resource #8) within the second SRS resource set. Further, there may be a separate UE capability for whether the redundancy configuration is allowed and a procedure in which the UE reports the corresponding UE capability information to the BS may be applied. Through this, the above-described scheme may be applied according to the whether the redundancy configuration is allowed and/or whether the UE is implemented.

For example, when the redundancy configuration is allowed, the UE may receive a CSI-RS resource corresponding to CRI #11 with a transmission/reception module (e.g., transmission/reception panel) of the UE corresponding to the first SRS resource set, and the UE may transmit the codebook based PUSCH, the non-codebook based PUSCH, and/or the SRS within SRS resource #4 by using a transmission beam corresponding to a reception beam of the CSI-RS resource within the transmission/reception module. Further, the corresponding UE may receive a CSI-RS resource corresponding to CRI #11 with a transmission/reception module (e.g., transmission/reception panel) of the UE corresponding to the second SRS resource set, and the UE may transmit the codebook based PUSCH, the non-codebook based PUSCH, and/or the SRS in SRS resource #8 by using the transmission beam corresponding to the reception beam of the CSI-RS resource within the transmission/reception module. As an example, each of the transmission/reception module may be determined by reception of SSB #3 and reception of SSB #7. Further, the CSI-RS resource corresponding to CRI #11 may mean a specific beam among the beams of the BS. In other words, the corresponding CSI-RS resource may be based on the same transmission beam of the BS.

If both SRS resource #4 and SRS resource #8 are indicated when the UE schedules the UL transmission of the UE, the BS may obtain an effect of being capable of effectively receiving the corresponding UL transmission with a BS reception beam corresponding to the transmission beam of CRI #11 when receiving the corresponding UL transmission. In other words, a plurality of panel(s) and/or a plurality of beam(s) of the UE may correspond (or be reciprocal) to a single panel and/or a single beam of the BS.

Further, in order to support the above-described proposal operations, a source RS of spatial QCL (e.g., QCL type D) configured and/or indicated for the CSI-RS resource corresponding to CRI #11 exemplified above may be configured to become {SSB #3 and/or SSB #7} (e.g., integration of SSB #3 and SSB #7 in terms of a beam region). Further, a scheme may also be considered, in which when CRI #11 is an aperiodic CSI-RS type, the BS selectively changes and/or indicates the source RS of the spatial QCL followed by CRI #11 to be SSB #3 or SSB #7 at every transmission time by individual trigger based on the DCI. In this case, the change and/or indication may be dynamic or semi-dynamic.

Further, in the present disclosure, a method may also be considered, which applies the above-described proposal scheme by considering the time domain behavior(s) in relation to scheduling (i.e., UL scheduling) for the codebook based PUSCH transmission and/or non-codebook based PUSCH transmission.

For example, in the above contents, a method for dynamically indicating a local resource identifier (e.g., local SRS resource ID) by using the UL DCI (e.g., DCI format 0_1) is described. In addition, when multiple SRS resource sets are configured, in which the usage of the SRS resource is configured to the usage of the codebook based uplink transmission and/or the non-codebook based uplink transmission, a scheme of performing the panel unit and/or beam unit indication by considering the time-domain behaviors of the multiple SRS resource sets may be considered. A codepoint(s) (e.g., SRI state, UL TCI state) of a specific field (e.g., SRI field, UL TCI state field, etc.) within the UL DCI may be mapped over an SRS resource set(s) configured for the same specific time-domain behavior among the multiple SRS resource sets, and a scheme of configuring and/or indicating dynamic panel selection by using the codepoint(s) may be applied. The reason is that the SRS resources within the multiple SRS resource sets may be configured by mixing with a codepoint(s) within a specific field of the corresponding UL DCI.

As an example, in this regard, information related to which time domain behavior the BS is to apply the corresponding scheme to may be configured (or defined) to be down-selected, activated, deactivated, updated, changed, and/or switched based on the higher layer signaling (e.g., RRC signaling) and/or MAC-CE signaling. As an example, in this regard, mapping of the codepoint(s) may be performed by combinatorial mapping. In other words, the information may be mechanically configured and/or defined so that a specific field within the UL DCI is configured by a rule of making sequential mechanical codepoint mapping of the SRS resource(s) within the corresponding SRS resource set.

When the scheme in the example is applied, a power control behavior for the codebook based PUSCH transmission and/or non-codebook based PUSCH transmission may be configured to follow the power control scheme corresponding to the SRS resource set to which a specific codepoint (e.g., SRI, UL TCI state) in a specific field of the UL DCI. As an example, a power for the codebook based PUSCH transmission and/or non-codebook based PUSCH transmission may be controlled by applying a power control related parameter configured in the corresponding SRS resource set. Further, a power control may also be performed, which is interlocked based on a specific offset (e.g., power control related offset value).

Further, unlike the above-described scheme, in the case where two or more time-domain behaviors are configurable together, only SRS resources following the same time-domain behavior may be defined or configured to be indicated in the case where two or more SRS resources are indicated together when performing the PUSCH scheduling. Alternatively, the UE may expect to be indicated with only the SRS resources following the same time-domain behavior. Here, the case where two or more SRS resources are indicated together means multi-beam and/or multi-panel based simultaneous UL transmission.

Further, in at least one of the proposal methods described above in the present disclosure, a specific linkage (or association) related signaling may be defined or configured, which applies SRS resource set(s) configured for other usages (e.g., BM usage, antenna switching usage, etc.) together for the codebook based and/or non-codebook based PUSCH transmission without configuring the SRS resource set(s) (separately or exclusively) for the usage of the codebook based and/or non-codebook based PUSCH transmission. In this case, an effect may be obtained, which is capable of using the SRS resource set(s) for other usages for the usage of the codebook based and/or non-codebook based PUSCH transmission only by the signaling without a process of configuring the SRS resource set(s) for the usage of the codebook based and/or non-codebook based PUSCH transmission. Through this, there is an effect of being capable of reducing a latency required for final PUSCH scheduling and reducing even overhead related to the SRS resource configuration.

The corresponding scheme may be applied by considering the number of ports of the SRS resource related to the corresponding SRS resource set, implementation (e.g., nT/mR implementation, etc.) of the UE related to antenna switching, etc. In other words, when the corresponding scheme is suitable for the implementation situation (i.e., capability information of the UE, etc.) of the UE, the corresponding scheme may be selectively applied.

Further, in relation to the scheme proposed in the present disclosure described above, in the case of the non-codebook based PUSCH transmission, the UE may also report, to the BS, its capability information that simultaneous uplink transmission based multiple UE panels is impossible. As an example, even though two or more panels of the panels supported by the UE are activated for the PUSCH transmission, information that only one panel is available for each actual transmission may be included in the form of the capability information of the UE. In the following description, the capability information of the UE is described based on the non-codebook based PUSCH transmission, but may be extensively applied even to other uplink transmission (e.g., codebook based PUSCH, PUCCH, SRS, PRACH, etc.).

In the case where there are two or more SRS resources when scheduling the uplink transmission (e.g., PUSCH transmission), all of the corresponding SRS resources may also be limited to be constituted only by SR resources corresponding to SRS resource identifiers which belong to the same specific SRS resource set. That is, the UE may expect that all of the SRS resources will be constituted by the SRS resources which belong to the same (specific) SRS resource set. Here, two or more SRS resources may be indicated by a specific field (e.g., SRI field) within the DCI.

For example, the UE may report, to the BS, the UE capability information that simultaneous transmission based on multiple panels is impossible as described above, and may be configured with the first SRS resource set and the second SRS resource set for the non-codebook based PUSCH transmission. Here, the UE capability information may includes information (e.g., 2, 4) on the maximum number of layers which the UE may support for the non-codebook based PUSCH transmission. Further, the first SRS resource set may be constituted by SRS resource #1, SRS resource #2, SRS resource #3, and SRS resource #4, and the second SRS resource set may be constituted by SRS resource #5, SRS resource #6, SRS resource #7, and SRS resource #8. Further, the UE capability information may includes the information on the maximum number of layers which the UE may support for the non-codebook based PUSCH transmission.

When the UE reports that the maximum number of layers is 2, the UE may effectively recognize (or expect) an operation in which up to 2 SRS resources are scheduled within the first SRS resource set or up to 2 SRS resources are scheduled within the second SRS resource set. However, the corresponding UE may not expect a scheduling indication of applying both one SRS resource within the first SRS resource set and one SRS resource within the second SRS resource set to the PUSCH transmission. The reason is that the scheduling indication is contrary to the capability information of the UE, which the corresponding UE reports to the BS.

Similarly to this, when the UE reports, to the BS, that simultaneous uplink transmission based on other panels (i.e., based on other SRS resource sets) is possible, the corresponding UE may additionally (or independently) report, to the BS, information on the maximum number of layers supportable for each panel in addition to the information on the maximum number of layers supportable for the non-codebook based PUSCH transmission.

For example, a case is considered, in which the UE reports that the maximum number of layers supportable for the non-codebook based PUSCH transmission is 4 and reports that the maximum number of layers supportable for each panel is 2. The corresponding UE may effectively recognize (or expect) an operation in which up to 2 SRS resources are scheduled within the first SRS resource set, up to 2 SRS resources are scheduled within the second SRS resource set, or up to 2 SRS resources in the first SRS resource set and up to 2 SRS resources in the second SRS resource set are simultaneously scheduled. However, the UE may not expect other scheduling indications. The reason is that the scheduling indication is contrary to the capability information of the UE, which the corresponding UE reports to the BS.

Further, similarly to this, when the UE reports, to the BS, that simultaneous uplink transmission based on other panels (i.e., based on other SRS resource sets) is possible, the corresponding UE may additionally (or independently) report, to the BS, the information on the maximum number of layers supportable for each panel as additional capability information limited to a case (or situation) in which simultaneous PUSCH transmission through two or more panels is scheduled, in addition to the information on the maximum number of layers supportable for the non-codebook based PUSCH transmission.

For example, a case is considered, in which the UE reports that the maximum number of layers supportable for the non-codebook based PUSCH transmission is 4 and reports that the maximum number of layers supportable for each panel is 2 only in the case (or situation) in which simultaneous PUSCH transmission through two or more panels is scheduled. The corresponding UE may effectively recognize (or expect) an operation in which up to 4 SRS resources are scheduled within the first SRS resource set, up to 2 SRS resources are scheduled within the second SRS resource set, or up to 4 SRS resources in the first SRS resource set and up to 2 SRS resources in the second SRS resource set are simultaneously scheduled. However, the UE may not expect a scheduling indication of applying both one SRS resource within the first SRS resource set and three SRS resources within the second SRS resource set to the PUSCH transmission. The reason is that the scheduling indication is contrary to the capability information of the UE, which the corresponding UE reports to the BS.

Further, in the methods and/or operations proposed in the present disclosure, indication information related to scheduling of the codebook PUSCH transmission and the non-codebook based PUSCH transmission may be configured and/or indicated by a specific field (or state) within DCI for the corresponding scheduling. On the contrary, when the corresponding PUSCH transmission is based on a configured grant, the indication information may be configured and/or indicated through the higher layer parameter (e.g., RRC signaling and/or MAC-CE signaling).

When the methods and/or operations proposed in the present disclosure is applied, the BS may obtain an effect of being capable of controlling the uplink transmission by a specific panel unit and/or a specific beam unit of the UE, in relation to the operations of performing the codebook based PUSCH transmission, the non-codebook based PUSCH transmission, and/or the SRS transmission by the UE. Through this, panel and/or beam selective PUSCH scheduling accompanying panel and/or beam unit enhanced power control may be performed.

FIG. 11 illustrates an example of an operation flowchart of a UE that performs uplink data channel (e.g., PUSCH) transmission based on panel unit and/or beam unit scheduling to which a method proposed in the present disclosure is applicable. FIG. 11 is just for convenience of description and does not limit the scope of the present disclosure.

Referring to FIG. 11, the UE and the BS may operate by using the PUSCH transmission method based on the panel unit and/or beam unit configuration (and/or indication) described above in the present disclosure in relation to the transmission of the uplink data channel.

The UE may receive configuration information related to an uplink data channel (S1105). For example, the configuration information may include resource configuration information related to the PUSCH transmission, configuration information for the panel and/or beam, and the like. As an example, the configuration information may include one or more configurations (e.g., UL TCI states) including at least one of a transmission unit (e.g., the above-described panel, the SRS resource set configured for the BM usage, etc.) or a beam (e.g., the SRS resource configured for the BM usage) related to the transmission of the uplink data channel.

For example, the operation of the UE (e.g., reference numeral 1310 and/or 1320 of FIGS. 13 to 17) which receives the configuration information in step S1105 described above may be implemented by devices of FIGS. 13 to 17 to be described below. For example, referring to FIG. 13, one or more processors 102 may control one or more transceivers 106 and/or one or more memories 104 so as to transmit the configuration information and one or more transceivers 106 may receive the configuration information.

The UE may receive control information (e.g., the above-described DCI, DCI format 0_1, MAC-CE, etc.) for scheduling the transmission of the uplink data channel. For example, based on the one or more configurations, the control information may include information indicating a transmission unit and a beam to be applied to the transmission of the uplink data channel. As an example, as described above, the control information may include information indicating a panel and/or a beam to be applied to the PUSCH transmission. As an example, the specific field (e.g., UL TCI state field) included in the control information may be used for indicating information (e.g., panel indicator, specific SRS resource set) representing a panel and/or information (e.g., resource or identification information of UL RS (or channel) and resource or identification information of DL RS (or channel)) representing a beam related to the PUSCH transmission.

For example, the operation of the UE (e.g., reference numeral 1310 and/or 1320 of FIGS. 13 to 17) which receives the control information in step S1110 described above may be implemented by devices of FIGS. 13 to 17 to be described below. For example, referring to FIG. 13, one or more processors 102 may control one or more transceivers 106 and/or one or more memories 104 so as to transmit the control information and one or more transceivers 106 may receive the control information.

The UE may transmit the uplink data channel based on the control information (and/or the configuration information) (S1115).

For example, the operation of the UE (e.g., reference numeral 1310 and/or 1320 of FIGS. 13 to 17) which transmits the uplink data channel in step S1115 described above may be implemented by devices of FIGS. 13 to 17 to be described below. For example, referring to FIG. 13, one or more processors 102 may control one or more transceivers 106 and/or one or more memories 104 so as to transmit the uplink data channel and one or more transceivers 106 may transmit the uplink data channel.

FIG. 12 illustrates an example of an operation flowchart of a BS that performs uplink data channel (e.g., PUSCH)

reception based on panel unit and/or beam unit scheduling to which a method proposed in the present disclosure is applicable. FIG. 12 is just for convenience of description and does not limit the scope of the present disclosure.

Referring to FIG. 12, the UE and the BS may operate by using the PUSCH reception method based on the panel unit and/or beam unit configuration (and/or indication) described above in the present disclosure in relation to the reception of the uplink data channel.

The BS may transmit configuration information related to an uplink data channel (S1205). For example, the configuration information may include resource configuration information related to the PUSCH transmission, configuration information for the panel and/or beam, and the like. As an example, the configuration information may include one or more configurations (e.g., UL TCI states) including at least one of a transmission unit (e.g., the above-described panel, the SRS resource set configured for the BM usage, etc.) or a beam (e.g., the SRS resource configured for the BM usage) related to the transmission of the uplink data channel.

For example, the operation of the BS (e.g., reference numeral 1310 and/or 1320 of FIGS. 13 to 17) which transmits the configuration information in step S1105 described above may be implemented by devices of FIGS. 13 to 17 to be described below. For example, referring to FIG. 13, one or more processors 102 may control one or more transceivers 106 and/or one or more memories 104 so as to transmit the configuration information and one or more transceivers 106 may transmit the configuration information.

The BS may transmit control information (e.g., the above-described DCI, DCI format 0_1, MAC-CE, etc.) for scheduling the transmission of the uplink data channel. For example, based on the one or more configurations, the control information may include information indicating a transmission unit and a beam to be applied to the transmission of the uplink data channel. As an example, as described above, the control information may include information indicating a panel and/or a beam to be applied to the PUSCH transmission. As an example, the specific field (e.g., UL TCI state field) included in the control information may be used for indicating information (e.g., panel indicator, specific SRS resource set) representing a panel and/or information (e.g., resource or identification information of UL RS (or channel) and resource or identification information of DL RS (or channel)) representing a beam related to the PUSCH transmission.

For example, the operation of the BS (e.g., reference numeral 1310 and/or 1320 of FIGS. 13 to 17) which transmits the control information in step S1110 described above may be implemented by devices of FIGS. 13 to 17 to be described below. For example, referring to FIG. 13, one or more processors 102 may control one or more transceivers 106 and/or one or more memories 104 so as to transmit the control information and one or more transceivers 106 may transmit the control information.

The BS may receive the uplink data channel based on the control information (and/or the configuration information) (S1115). As an example, the BS may receive the uplink data channel by using a reception beam thereof, which corresponds to a transmission beam of the UE, which is configured and/or indicated based on the control information (and/or the configuration information).

For example, the operation of the BS (e.g., reference numeral 1310 and/or 1320 of FIGS. 13 to 17) which receives the uplink data channel in step S1115 described above may be implemented by devices of FIGS. 13 to 17 to be described below. For example, referring to FIG. 13, one or more processors 102 may control one or more transceivers 106 and/or one or more memories 104 so as to receive the uplink data channel and one or more transceivers 106 may receive the uplink data channel.

Further, in relation to the steps in FIGS. 11 and 12 described above, the following examples may be additionally applied.

For example, the transmission unit to be applied to the transmission of the uplink data channel may be based on a set configured as one or more uplink reference signals. Further, the beam to be applied to the transmission of the uplink data channel may be based on any one of the one or more uplink reference signals. That is, the beam may be a component included in the transmission unit. In other words, a beam to be applied when the UE transmits the uplink data channel may be one of the beams constituting the panel configured (or indicated) for transmission of the corresponding uplink data channel. As an example, as described above, the set may include a set of sounding reference signal resources, etc., and the set of the sounding reference signal resources may be configured for a beam management usage.

For example, the transmission unit to be applied to the transmission of the uplink data channel may be based on a set configured as one or more downlink reference signals. Further, the beam to be applied to the transmission of the uplink data channel may be based on any one of the one or more downlink reference signals. That is, the beam may be a component included in the transmission unit. In other words, a beam to be applied when the UE transmits the uplink data channel may be one of the beams constituting the panel configured (or indicated) for transmission of the corresponding uplink data channel. As an example, as described above, the set may include a set of Channel State Information-Reference Signal (CSI-RS) resources or a set of synchronization signal block identifiers.

For example, the UE may transmit UE capability information related to the number of transmission units which the UE may simultaneously support for the transmission of the uplink data channel. As an example, as described above, even though multiple panels of the UE are activated for the PUSCH transmission, there may be a constraint that only one panel is actually used for the PUSCH transmission and the corresponding UE may report information related to the constraint in the form of the UE capability information.

For example, a power control for the transmission of the uplink data channel may be configured for each transmission unit (e.g., panel).

Through this, an effect can be acquired, in which in relation to an operation in which the UE performs the codebook based PUSCH transmission and/or non-codebook based PUSCH transmission, the BS may control uplink transmission in units of a specific panel and/or a specific beam of the UE. Further, panel and/or beam selective PUSCH scheduling accompanying panel and/or beam unit enhanced power control may be performed.

Communication System Applied to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 13 illustrates a communication system 1300 applied to the present disclosure.

Referring to FIG. 13, a communication system 1300 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 1310a, vehicles 1310b-1 and 1310b-2, an eXtended Reality (XR) device 1310c, a hand-held device 1310d, a home appliance 1310e, an Internet of Things (IoT) device 1310f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 1320a may operate as a BS/network node with respect to other wireless devices.

The wireless devices 1310a to 1310f may be connected to the network 300 via the BSs 1320. An AI technology may be applied to the wireless devices 1310a to 1310f and the wireless devices 1310a to 1310f may be connected to the AI server 400 via the network 300. The network 300 may be configured using a 3G network, a 4G (e.g., LTE) network, or a 5G (e.g., NR) network. Although the wireless devices 1310a to 1310f may communicate with each other through the BSs 1320/network 300, the wireless devices 1310a to 1310f may perform direct communication (e.g., sidelink communication) with each other without passing through the BSs/network. For example, the vehicles 1310b-1 and 1310b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 1310a to 1310f.

Wireless communication/connections 150a, 150b, or 150c may be established between the wireless devices 1310a to 1310f/BS 1320, or BS 1320/BS 1320. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Wireless Devices Applicable to the Present Disclosure

FIG. 14 illustrates wireless devices applicable to the present disclosure.

Referring to FIG. 14, a first wireless device 1310 and a second wireless device 1320 may transmit radio signals through a variety of RATs (e.g., LTE and NR). Herein, {the first wireless device 1310 and the second wireless device 1320} may correspond to {the wireless device 1310x and the BS 1320} and/or {the wireless device 1310x and the wireless device 1310x} of FIG. 13.

The first wireless device 1310 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 1320 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 206 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 1310 and 1320 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Signal Processing Circuit Example to which Present Disclosure is Applied

FIG. 15 illustrates a signal processing circuit for a transmit signal.

Referring to FIG. 15, a signal processing circuit 2000 may include a scrambler 2010, a modulator 2020, a layer mapper 2030, a precoder 2040, a resource mapper 2050, and a signal generator 2060. Although not limited thereto, an operation/function of FIG. 15 may be performed by the processors 102 and 202 and/or the transceivers 106 and 206 of FIG. 14. Hardware elements of FIG. 15 may be implemented in the processors 102 and 202 and/or the transceivers 106 and 206 of FIG. 14. For example, blocks 2010 to 2060 may be implemented in the processors 102 and 202 of FIG. 14. Further, blocks 2010 to 2050 may be implemented in the processors 102 and 202 of FIG. 14 and the block 2060 of FIG. 14 and the block 2760 may be implemented in the transceivers 106 and 206 of FIG. 14.

A codeword may be transformed into a radio signal via the signal processing circuit 2000 of FIG. 15. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 2010. A scramble sequence used for scrambling may be generated based on an initialization value and the initialization value may include ID information of a wireless device. The scrambled bit sequence may be modulated into a modulated symbol sequence by the modulator 2020. A modulation scheme may include pi/2-BPSK(pi/2-Binary Phase Shift Keying), m-PSK(m-Phase Shift Keying), m-QAM(m-Quadrature Amplitude Modulation), etc. A complex modulated symbol sequence may be mapped to one or more transport layers by the layer mapper 2030. Modulated symbols of each transport layer may be mapped to a corresponding antenna port(s) by the precoder 2040 (precoding). Output z of the precoder 2040 may be obtained by multiplying output y of the layer mapper 2030 by precoding matrix W of N*M. Here, N represents the number of antenna ports and M represents the number of transport layers. Here, the precoder 2040 may perform precoding after performing transform precoding (e.g., DFT transform) for complex modulated symbols. Further, the precoder 2040 may perform the precoding without performing the transform precoding.

The resource mapper 2050 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 2060 may generate the radio signal from the mapped modulated symbols and the generated radio signal may be transmitted to another device through each antenna. To this end, the signal generator 2060 may include an Inverse Fast Fourier Transform (IFFT) module, a Cyclic Prefix (CP) inserter, a Digital-to-Analog Converter (DAC), a frequency uplink converter, and the like.

A signal processing process for a receive signal in the wireless device may be configured in the reverse of the signal processing process (2010 to 2060) of FIG. 15. For example, the wireless device (e.g., 100 or 200 of FIG. 26) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource demapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Wireless Device Example to which Present Disclosure is Applied

FIG. 16 illustrates another example of a wireless device applied to the present disclosure. The wireless device may be implemented in various forms according to a use-case/service (refer to FIG. 16).

Referring to FIG. 16, wireless devices 1310 and 1320 may correspond to the wireless devices 1310 and 1320 of FIG. 13 and may be configured by various elements, components, units/portions, and/or modules. For example, each of the wireless devices 1310 and 1320 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 104 of FIG. 26. For example, the transceiver(s) 114 may include the one or more transceivers 106 and 106 and/or the one or more antennas 108 and 108 of FIG. 26. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (1310a of FIG. 13), the vehicles (1310b-1 and 1310b-2 of FIG. 13), the XR device (1310c of FIG. 13), the hand-held device (1310d of FIG. 13), the home appliance (1310e of FIG. 13), the IoT device (1310f of FIG. 13), a digital broadcast terminal, a hologram device, a public safety device, an MTC device, a medicine device, a fintech device (or a finance device), a security device, a climate/environment device, the AI server/device (400 of FIG. 13), the BSs (1320 of FIG. 13), a network node, etc. The wireless device may be used in a mobile or fixed place according to a use-example/service.

In FIG. 16, the entirety of the various elements, components, units/portions, and/or modules in the wireless devices 1310 and 1320 may be connected to each other through a wired interface or at least a part thereof may be wirelessly connected through the communication unit 110. For example, in each of the wireless devices 1310 and 1320, the control unit 120 and the communication unit 110 may be connected by wire and the control unit 120 and first units (e.g., 130 and 140) may be wirelessly connected through the communication unit 110. Each element, component, unit/portion, and/or module within the wireless devices 1310 and 1320 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Portable Device Example to which Present Disclosure is Applied

FIG. 17 illustrates a portable device applied to the present disclosure. The portable device may include a smart phone, a smart pad, a wearable device (e.g., a smart watch, a smart glass), and a portable computer (e.g., a notebook, etc.). The portable device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 17, a portable device 1310 may include an antenna unit 108, a communication unit 110, a control unit 120, a memory unit 130, a power supply unit 140*a*, an interface unit 140*b*, and an input/output unit 140*c*. The antenna unit 108 may be configured as a part of the communication unit 110. The blocks 110 to 130/140*a* to 140*c* correspond to the blocks 110 to 130/140 of FIG. 13, respectively.

The communication unit 110 may transmit/receive a signal (e.g., data, a control signal, etc.) to/from another wireless device and eNBs. The control unit 120 may perform various operations by controlling components of the portable device 1310. The control unit 120 may include an Application Processor (AP). The memory unit 130 may store data/parameters/programs/codes/instructions required for driving the portable device 1310. Further, the memory unit 130 may store input/output data/information, etc. The power supply unit 140*a* may supply power to the portable device 1310 and include a wired/wireless charging circuit, a battery, and the like. The interface unit 140*b* may support a connection between the portable device 1310 and another external device. The interface unit 140*b* may include various ports (e.g., an audio input/output port, a video input/output port) for the connection with the external device. The input/output unit 140*c* may receive or output a video information/signal, an audio information/signal, data, and/or information input from a user. The input/output unit 140*c* may include a camera, a microphone, a user input unit, a display unit 140*d*, a speaker, and/or a haptic module.

As one example, in the case of data communication, the input/output unit 140*c* may acquire information/signal (e.g., touch, text, voice, image, and video) input from the user and the acquired information/signal may be stored in the memory unit 130. The communication unit 110 may transform the information/signal stored in the memory into the radio signal and directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140*c*.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and can implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

Although a scheme of transmitting and receiving data in a wireless communication system of the present disclosure has been described with reference to an example applied to a 3GPP LTE/LTE-A system or a 5G system (New RAT system), the scheme may be applied to various wireless communication systems in addition to the 3GPP LTE/LTE-A system or 5G system.

The invention claimed is:

1. A method for transmitting, by a user equipment (UE), an uplink data channel in a wireless communication system, the method comprising:
receiving configuration information related to the uplink data channel, wherein the configuration information is related to linkage between each of first sounding reference signal (SRS) resource sets for uplink data channel transmission and each of second SRS resource sets for beam management;
receiving control information for scheduling transmission of the uplink data channel, wherein an SRS resource indicator (SRI) in the control information is related to dynamic selection only with respect to one or more of the second SRS resource sets linked to one or more of the first SRS resource sets for the scheduled transmission of the uplink data channel; and
transmitting the uplink data channel based on the control information, wherein the configuration information includes one or more configurations including at least one of i) a transmission unit or ii) a beam, which are related to the transmission of the uplink data channel, wherein based on the one or more configurations, the control information includes information indicating a transmission unit and a beam to be applied to the transmission of the uplink data channel, and wherein the transmission unit is related to the one or more of the second SRS resource sets, and the beam to be applied to the transmission of the uplink data channel is related to the SRI.

2. The method of claim 1, wherein the transmission unit to be applied to the transmission of the uplink data channel is based on a set configured as one or more downlink reference signals, and wherein the beam to be applied to the transmission of the uplink data channel is based on any one of the one or more downlink reference signals.

3. The method of claim 2, wherein the set includes at least one of a set of Channel State Information-Reference Signal (CSI-RS) resources or a set of synchronization signal block identifiers.

4. The method of claim 1, further comprising:

transmitting UE capability information related to the number of transmission units that the UE is able to support simultaneously for the transmission of the uplink data channel.

5. The method of claim 1, wherein a power control for the transmission of the uplink data channel is configured for each transmission unit.

6. A user equipment (UE) transmitting an uplink data channel in a wireless communication system, the UE comprising:

a transceiver;

at least one processor controlling the transceiver; and at least one memory functionally connected to the at least one processor, wherein the at least one processor is configured to receive configuration information related to the uplink data channel, wherein the configuration information is related to linkage between each of first sounding reference signal (SRS) resource sets for uplink data channel transmission and each of second SRS resource sets for beam management, receive control information for scheduling transmission of the uplink data channel, wherein an SRS resource indicator (SRI) in the control information is related to dynamic selection only with respect to one or more of the second SRS resource sets linked to one or more of the first SRS resource sets for the scheduled transmission of the uplink data channel, and transmit the uplink data channel based on the control information, wherein the configuration information includes one or more configurations including at least one of i) a transmission unit or ii) a beam, which are related to the transmission of the uplink data channel, wherein based on the one or more configurations, the control information includes information indicating a transmission unit and a beam to be applied to the transmission of the uplink data channel, and wherein the transmission unit is related to the one or more of the second SRS resource sets, and the beam to be applied to the transmission of the uplink data channel is related to the SRI.

7. The UE of claim 6, wherein the transmission unit to be applied to the transmission of the uplink data channel is based on a set configured as one or more downlink reference signals, and wherein the beam to be applied to the transmission of the uplink data channel is based on any one of the one or more downlink reference signals.

8. The UE of claim 7, wherein the set includes at least one of a set of Channel State Information-Reference Signal (CSI-RS) resources or a set of synchronization signal block identifiers.

9. An apparatus transmitting an uplink data channel in a wireless communication system, the apparatus comprising:

at least one processor; and at least one memory functionally connected to the at least one processor, wherein the at least one processor is configured to receive configuration information related to the uplink data channel, wherein the configuration information is related to linkage between each of first sounding reference signal (SRS) resource sets for uplink data channel transmission and each of second SRS resource sets for beam management, receive control information for scheduling transmission of the uplink data channel, wherein an SRS resource indicator (SRI) in the control information is related to dynamic selection only with respect to one or more of the second SRS resource sets linked to one or more of the first SRS resource sets for the scheduled transmission of the uplink data channel, and transmit the uplink data channel based on the control information, wherein the configuration information includes one or more configurations including at least one of i) a transmission unit or ii) a beam, which are related to the transmission of the uplink data channel, wherein based on the one or more configurations, the control information includes information indicating a transmission unit and a beam to be applied to the transmission of the uplink data channel, and wherein the transmission unit is related to the one or more of the second SRS resource sets, and the beam to be applied to the transmission of the uplink data channel is related to the SRI.

* * * * *